United States Patent
Fan et al.

(10) Patent No.: US 9,416,645 B2
(45) Date of Patent: Aug. 16, 2016

(54) EXTRACTION OF HYDROCARBONS FROM HYDROCARBON-CONTAINING MATERIALS AND/OR PROCESSING OF HYDROCARBON-CONTAINING MATERIALS

(71) Applicant: GREEN SOURCE HOLDINGS LLC, Austin, TX (US)

(72) Inventors: Liang-tseng Fan; Shahram Reza Shafie, Austin, TX (US); Julius Michael Tollas, The Woodlands, TX (US); William Arthur Fitzhugh Lee, Spicewood, TX (US)

(73) Assignee: Green Source Holdings LLC, Austin, TX (US)

(*) Notice: Subject to any disclaimer, the term of this patent is extended or adjusted under 35 U.S.C. 154(b) by 0 days.

(21) Appl. No.: 14/877,109

(22) Filed: Oct. 7, 2015

(65) Prior Publication Data

US 2016/0053600 A1    Feb. 25, 2016

Related U.S. Application Data

(60) Continuation of application No. 14/230,281, filed on Mar. 31, 2014, now Pat. No. 9,181,468, which is a continuation of application No. 13/777,430, filed on Feb. 26, 2013, now Pat. No. 8,685,234, which is a (Continued)

(51) Int. Cl.
*E21B 43/38* (2006.01)
*C09K 8/54* (2006.01)
(Continued)

(52) U.S. Cl.
CPC . *E21B 43/38* (2013.01); *C09K 8/54* (2013.01); *C09K 8/58* (2013.01); *C09K 8/64* (2013.01); *C10G 1/04* (2013.01); *C10G 21/27* (2013.01); *E21B 43/16* (2013.01); *Y10T 137/0391* (2015.04)

(58) Field of Classification Search
None
See application file for complete search history.

(56) References Cited

U.S. PATENT DOCUMENTS

| 2,191,767 A | 2/1940 | McCluer et al. |
| 2,324,980 A | 7/1943 | Kilbourne |

(Continued)

FOREIGN PATENT DOCUMENTS

| DE | 108364 | 12/1897 |
| DE | 277602 | 2/1913 |

(Continued)

OTHER PUBLICATIONS

Anabtawi, M. Z. A., et al., "Utilisation of shale oil by the extraction and retorting of oil shale", International Journal of Environmental Technology and Management, 2004, vol. 4, No. 3, pp. 199-207.

(Continued)

*Primary Examiner* — Tam M Nguyen
(74) *Attorney, Agent, or Firm* — Rothwell, Figg, Ernst & Manbeck, P.C.

(57) ABSTRACT

A method of extracting hydrocarbon-containing organic matter from a hydrocarbon-containing material includes the steps of providing a first liquid comprising a turpentine liquid; contacting the hydrocarbon-containing material with the turpentine liquid to form an extraction mixture; extracting the hydrocarbon material into the turpentine liquid; and separating the extracted hydrocarbon material from a residual material not extracted.

8 Claims, 8 Drawing Sheets

Related U.S. Application Data division of application No. 12/404,016, filed on Mar. 13, 2009, now Pat. No. 8,404,108, which is a continuation-in-part of application No. 12/298,993, filed as application No. PCT/US2008/010831 on Sep. 17, 2008, now Pat. No. 8,404,107, which is a continuation-in-part of application No. 12/174,139, filed on Jul. 16, 2008, now Pat. No. 8,272,442, and a continuation-in-part of application No. 12/053,126, filed on Mar. 21, 2008, now Pat. No. 8,101,812.

(60) Provisional application No. 60/973,964, filed on Sep. 20, 2007.

(51) Int. Cl.
    *C10G 1/04* (2006.01)
    *C09K 8/58* (2006.01)
    *E21B 43/16* (2006.01)
    *C09K 8/64* (2006.01)
    *C10G 21/27* (2006.01)

(56) References Cited

U.S. PATENT DOCUMENTS

| | | | |
|---|---|---|---|
| 2,356,254 | A | 8/1944 | Lehmann, Jr. et al. |
| 2,549,438 | A | 4/1951 | De Groote |
| 3,061,097 | A | 10/1962 | Dering et al. |
| 3,279,541 | A | 10/1966 | Knox et al. |
| 3,288,215 | A | 11/1966 | Townsend et al. |
| 3,363,690 | A | 1/1968 | Fischer |
| 3,437,146 | A | 4/1969 | Everhart et al. |
| 3,724,553 | A | 4/1973 | Snavely et al. |
| 3,855,069 | A | 12/1974 | Hess et al. |
| 3,865,187 | A | 2/1975 | Carlin et al. |
| 3,881,551 | A | 5/1975 | Terry et al. |
| 3,909,390 | A | 9/1975 | Urban |
| 3,993,555 | A | 11/1976 | Park et al. |
| 4,011,153 | A | 3/1977 | Fu |
| 4,021,329 | A | 5/1977 | Seitzer |
| 4,028,219 | A | 6/1977 | Baldwin et al. |
| 4,029,567 | A | 6/1977 | Farnand et al. |
| 4,060,479 | A | 11/1977 | Barcellos |
| 4,094,770 | A | 6/1978 | Bose |
| 4,098,648 | A | 7/1978 | Kraemer et al. |
| 4,104,205 | A | 8/1978 | Novotny et al. |
| 4,108,760 | A | 8/1978 | Williams et al. |
| 4,154,301 | A | 5/1979 | Carlin et al. |
| 4,191,630 | A | 3/1980 | Morrell |
| 4,216,828 | A | 8/1980 | Blair |
| 4,260,019 | A | 4/1981 | Blair, Jr. |
| 4,273,191 | A | 6/1981 | Hradel |
| 4,337,828 | A | 7/1982 | Blair, Jr. |
| 4,338,183 | A | 7/1982 | Gatsis |
| 4,341,265 | A | 7/1982 | Blair, Jr. |
| 4,374,023 | A | 2/1983 | Davis |
| 4,381,035 | A | 4/1983 | Hradel |
| 4,389,300 | A | 6/1983 | Mitchell |
| 4,396,491 | A | 8/1983 | Stiller et al. |
| 4,401,551 | A | 8/1983 | Mitchell |
| 4,409,362 | A | 10/1983 | Bzdula et al. |
| 4,419,214 | A | 12/1983 | Balint et al. |
| 4,438,816 | A | 3/1984 | Urban et al. |
| 4,443,323 | A | 4/1984 | Horikoshi et al. |
| 4,448,589 | A | 5/1984 | Fan et al. |
| 4,461,696 | A | 7/1984 | Bock et al. |
| 4,485,007 | A | 11/1984 | Tam et al. |
| 4,485,869 | A | 12/1984 | Sresty et al. |
| 4,485,871 | A | 12/1984 | Davis |
| 4,502,950 | A | 3/1985 | Ikematsu et al. |
| 4,505,808 | A | 3/1985 | Brunner et al. |
| 4,511,488 | A | 4/1985 | Matta |
| 4,532,024 | A | 7/1985 | Haschke et al. |
| 4,533,460 | A | 8/1985 | Ho |
| 4,539,093 | A | 9/1985 | Friedman et al. |
| 4,541,916 | A | 9/1985 | Beuther et al. |
| 4,576,708 | A | 3/1986 | Oko et al. |
| 4,592,831 | A | 6/1986 | Rhoe et al. |
| 4,640,767 | A | 2/1987 | Zajic et al. |
| 4,650,496 | A | 3/1987 | Funk |
| 4,659,498 | A | 4/1987 | Stoufer |
| 4,663,059 | A | 5/1987 | Ford et al. |
| 4,673,133 | A | 6/1987 | Datta et al. |
| 4,719,008 | A | 1/1988 | Sparks et al. |
| 4,746,420 | A | 5/1988 | Darian et al. |
| 4,765,885 | A | 8/1988 | Sadeghi et al. |
| 4,772,379 | A | 9/1988 | Gomberg |
| 4,814,094 | A | 3/1989 | Blair, Jr. et al. |
| 4,842,715 | A | 6/1989 | Paspek, Jr. et al. |
| 4,856,587 | A | 8/1989 | Nielson |
| 4,891,131 | A | 1/1990 | Sadeghi et al. |
| RE33,210 | E | 5/1990 | Stoufer |
| 4,929,341 | A | 5/1990 | Thirumalachar et al. |
| 4,968,413 | A | 11/1990 | Datta et al. |
| 4,971,151 | A | 11/1990 | Sheehy |
| 5,017,281 | A | 5/1991 | Sadeghi et al. |
| 5,031,648 | A | 7/1991 | Lutener et al. |
| 5,053,118 | A | 10/1991 | Houser |
| 5,102,566 | A | 4/1992 | Fetterman, Jr. et al. |
| 5,120,900 | A | 6/1992 | Chen et al. |
| 5,234,577 | A | 8/1993 | Van Slyke |
| 5,244,566 | A | 9/1993 | Bond |
| 5,284,625 | A | 2/1994 | Isayev et al. |
| 5,328,518 | A | 7/1994 | Hamilton et al. |
| 5,362,316 | A | 11/1994 | Paradise |
| 5,362,759 | A | 11/1994 | Hunt et al. |
| 5,454,878 | A | 10/1995 | Bala et al. |
| 5,489,394 | A | 2/1996 | Ford et al. |
| 5,490,531 | A | 2/1996 | Bala et al. |
| 5,492,828 | A | 2/1996 | Premuzic et al. |
| 5,534,136 | A | 7/1996 | Rosenbloom |
| 5,547,925 | A | 8/1996 | Duncan, Jr. |
| 5,549,839 | A | 8/1996 | Chandler |
| 5,559,085 | A | 9/1996 | Duncan, Jr. |
| 5,587,354 | A | 12/1996 | Duncan, Jr. |
| 5,602,186 | A | 2/1997 | Myers et al. |
| 5,634,984 | A | 6/1997 | Van Slyke |
| 5,676,763 | A | 10/1997 | Salisbury et al. |
| 5,677,354 | A | 10/1997 | Oliveira Da Cunha Lima |
| 5,780,407 | A | 7/1998 | Van Slyke |
| 5,788,781 | A | 8/1998 | Van Slyke |
| 5,811,607 | A | 9/1998 | Richardt et al. |
| 5,814,594 | A | 9/1998 | Vlasblom |
| 5,853,563 | A | 12/1998 | Ripley et al. |
| 5,858,247 | A | 1/1999 | Campbell |
| 5,863,881 | A | 1/1999 | Vlasblom |
| 5,877,133 | A | 3/1999 | Good |
| 5,891,926 | A | 4/1999 | Hunt et al. |
| 5,925,182 | A | 7/1999 | Patel et al. |
| 5,968,349 | A | 10/1999 | Duyvesteyn et al. |
| 5,985,816 | A | 11/1999 | Vlasblom |
| 5,998,640 | A | 12/1999 | Haefele et al. |
| 6,013,158 | A | 1/2000 | Wootten |
| 6,051,535 | A | 4/2000 | Bilden et al. |
| 6,090,769 | A | 7/2000 | Vlasblom |
| 6,093,689 | A | 7/2000 | Vlasblom |
| 6,120,680 | A | 9/2000 | Campbell |
| 6,173,776 | B1 | 1/2001 | Furman et al. |
| 6,197,734 | B1 | 3/2001 | Vlasblom |
| 6,211,133 | B1 | 4/2001 | Chesky |
| 6,228,830 | B1 | 5/2001 | Vlasblom |
| 6,235,698 | B1 | 5/2001 | Vlasblom |
| 6,248,396 | B1 | 6/2001 | Helf |
| 6,260,620 | B1 | 7/2001 | Furman et al. |
| 6,289,989 | B1 | 9/2001 | Mueller et al. |
| 6,310,263 | B1 | 10/2001 | Vlasblom |
| 6,319,395 | B1 | 11/2001 | Kirkbride et al. |
| 6,369,016 | B1 | 4/2002 | Vlasblom |
| 6,380,269 | B1 | 4/2002 | Benko et al. |
| 6,416,705 | B1 | 7/2002 | Dinzburg et al. |
| 6,479,558 | B1 | 11/2002 | Fliermans |
| 6,534,449 | B1 | 3/2003 | Gilmour et al. |
| 6,541,526 | B1 | 4/2003 | Goldshtein et al. |
| 6,543,535 | B2 | 4/2003 | Converse et al. |

(56) References Cited

U.S. PATENT DOCUMENTS

| | | |
|---|---|---|
| 6,564,869 B2 | 5/2003 | McKenzie et al. |
| 6,590,042 B1 | 7/2003 | Tang |
| 6,593,279 B2 | 7/2003 | Von Krosigk et al. |
| 6,709,573 B2 | 3/2004 | Smith |
| 6,797,684 B2 | 9/2004 | Henneberry et al. |
| 6,803,347 B1 | 10/2004 | Ladva et al. |
| 6,831,109 B1 | 12/2004 | Beirakh et al. |
| 6,858,090 B2 | 2/2005 | Hebert |
| 6,872,754 B1 | 3/2005 | Wortham |
| 6,924,319 B1 | 8/2005 | Alsdorf et al. |
| 6,936,159 B1 | 8/2005 | Kean |
| 6,992,116 B2 | 1/2006 | Benko et al. |
| 7,188,676 B2 | 3/2007 | Qu et al. |
| 7,192,912 B2 | 3/2007 | Laux |
| 7,198,103 B2 | 4/2007 | Campbell |
| 7,231,976 B2 | 6/2007 | Berry et al. |
| 7,311,838 B2 | 12/2007 | Herold et al. |
| 7,316,273 B2 | 1/2008 | Nguyen |
| 7,334,641 B2 | 2/2008 | Castellano |
| 7,392,844 B2 | 7/2008 | Berry et al. |
| 7,392,845 B2 | 7/2008 | Berry et al. |
| 7,481,273 B2 | 1/2009 | Javora et al. |
| 2003/0024703 A1 | 2/2003 | McKenzie et al. |
| 2003/0166472 A1 | 9/2003 | Pursley et al. |
| 2003/0213747 A1 | 11/2003 | Carbonell et al. |
| 2005/0161372 A1 | 7/2005 | Colic |
| 2005/0197267 A1 | 9/2005 | Zaki et al. |
| 2006/0035793 A1 | 2/2006 | Goldman |
| 2006/0042796 A1 | 3/2006 | Qu et al. |
| 2006/0065396 A1 | 3/2006 | Dawson et al. |
| 2006/0113218 A1 | 6/2006 | Hart et al. |
| 2006/0142172 A1 | 6/2006 | Cioletti et al. |
| 2007/0039732 A1 | 2/2007 | Dawson et al. |
| 2007/0095753 A1 | 5/2007 | Carbonell et al. |
| 2007/0125686 A1 | 6/2007 | Zheng et al. |
| 2007/0251693 A1 | 11/2007 | Cheramie et al. |
| 2007/0254815 A1 | 11/2007 | Cheramie et al. |
| 2008/0047876 A1 | 2/2008 | Keller |
| 2008/0073079 A1 | 3/2008 | Tranquilla et al. |
| 2008/0139418 A1 | 6/2008 | Cioletti et al. |
| 2008/0139678 A1 | 6/2008 | Fan et al. |
| 2008/0169222 A1 | 7/2008 | Ophus |
| 2008/0173447 A1 | 7/2008 | Da Silva et al. |
| 2008/0190818 A1 | 8/2008 | Dana et al. |
| 2008/0207981 A1 | 8/2008 | Hoag et al. |
| 2008/0249348 A1 | 10/2008 | Keller |
| 2008/0253840 A1 | 10/2008 | Shiau |
| 2008/0296024 A1 | 12/2008 | Huang et al. |
| 2009/0078612 A1 | 3/2009 | Fan et al. |
| 2009/0250381 A1 | 10/2009 | Fan et al. |

FOREIGN PATENT DOCUMENTS

| | | |
|---|---|---|
| DE | 374929 | 11/1918 |
| DE | 718585 | 4/1939 |
| DE | 682440 | 9/1939 |
| DE | 922713 | 5/1952 |
| DE | 2613122 A1 | 10/1976 |
| EP | 0391651 A2 | 10/1990 |
| EP | 0588865 B1 | 3/1994 |
| FR | 2828064 A1 | 2/2003 |
| GB | 108339 | 7/1917 |
| GB | 108448 | 7/1917 |
| GB | 120558 | 11/1919 |
| GB | 249519 | 6/1927 |
| GB | 322749 | 12/1929 |
| GB | 617869 | 2/1949 |
| GB | 672817 | 5/1952 |
| GB | 1311889 A | 3/1973 |
| GB | 2001670 A | 2/1979 |
| JP | 9165582 A | 6/1997 |
| JP | 2005105012 A | 4/2005 |
| NL | 7316416 A | 6/1975 |
| RU | 1816791 A1 | 5/1993 |
| RU | 1824418 A1 | 6/1993 |
| WO | WO 8402145 A1 | 6/1984 |
| WO | WO 9517244 A1 | 6/1995 |
| WO | WO 9920409 A1 | 4/1999 |
| WO | WO 9953764 A2 | 10/1999 |
| WO | WO 02/02249 A1 | 1/2002 |
| WO | WO 2005091771 A2 | 10/2005 |
| WO | WO 2006039772 A2 | 4/2006 |
| WO | WO 2007005944 A2 | 1/2007 |
| WO | WO 2007112254 A2 | 10/2007 |
| WO | WO 2008061304 A1 | 5/2008 |
| WO | WO 2009038728 A1 | 3/2009 |

OTHER PUBLICATIONS

Butler, R. M., et al., "Closed-loop Extraction Method for the Recovery of Heavy Oils and Bitumens Underlain by Aquifers: the Vapex Process", The Journal of Canadian Petroleum Technology, Apr. 1998, vol. 37, No. 4, pp. 41-50.

Das, Swapan K., et al., "Extraction of Heavy Oil and Bitumen Using Vaporized Hydrocarbon Solvents", Petroleum Science and Technology, 1997, 15(1&2):51-75.

Herrera, C., "Evaluation of Solvents and Methods of Extraction", Transportation Research Board, Texas Department of Transportation, 1996, 22 pgs. (Abstract).

Kabadi, Vinayak N., "A Study of the Effects of Enhanced Oil Recovery Agents on the Quality of Strategic Petroleum Reserves Crude Oil", Final Technical Report, Oct. 1992, 32 pgs.

Karsilayan, H. et al., "The increase of Efficiency OP Pine Oil by Heating and Usage in the Flotation of Oxidized Ahasra Coal", 1992, (Abstract).

Lewis, A. E., Oil Shale Quarterly Report, Lawrence Livermore National Lab., Jan.-Mar. 1986, 15 pgs.

Martel, R., et al., "Aquifer Washing by Micellar Solutions: 1 Optimization of Alcohol-Surfactant-Solvent Solutions", Journal of Contaminant Hydrology, 1998, 29:319-346 (Abstract).

Oliveira, M. C. K., et al., "Heavy Oil Fraction Removal From Sand Using Hydrotropes Containing Oil-in-Water Microemulsions", Progress in Colliod and Polymer Science, 2004, 288-292 (Abstract).

Popova, Inna E., et al., "Efficient Extraction of Fuel Oil Hydrocarbons from Wood", Separation Science and Technology, 2008, 43:778-793.

Salama, D., et al., "Experimental Observations of Miscible Displacement of Heavy Oils With Hydrocarbon Solvents", International Thermal Operations and Heavy Oil Symposium, 2005, pp. 1-8.

Sarkar, G. G., et al., "Selectivity of Coal Macerals During Flotation and Oil Agglomeration: A Case Study", International Journal of Coal Preparation and Utilization, 1984, 1(1):39-52 (Abstract).

Wen, Y., et al., "Evaluation of Bitumen-Solvent Properties Using Low Field NMR", Journal of Canadian Petroleum Technology, 2005, vol. 44, No. 4, pp. 22-28.

Wilkins, R. W. T., et al., "Coal As a Source Rock for Oil: A Review", International J. Coal Geology, 2002, 50:317-361 (Abstract).

"Test Method to Determine the Bitumen Content of Slurry Seal Mixture", Georgia Department of Transportation, Jan. 2007, 2 pgs.

Arso, A. and M. Iino, "Effect of amines added on Banko coal liquefaction," Fuel Processing Technology, 2007, vol. 88, pp. 813-816.

Ullmann's Encyclopedia of Industrial Chemistry, Sixth, Completely Revised Edition, vol. 37, p. 565 (2003).

Office Action issued in Taiwanese Patent Application No. 097136228 on Sep. 24, 2013 along with English translation, 13 pages.

Written Opinion issued in Singapore Patent Application No. 201106523-2 on Sep. 25, 15 pages.

English translation of the Office Action issued in Japanese Patent Application No. 2011-554027 on Oct. 8, 2013, 7 pages.

English translation of Office Action issued in Uzbek Patent Application IAP 20110432 on Oct. 31, 2014, 4 pages.

EXTRACTION OF HYDROCARBONS FROM HYDROCARBON-CONTAINING MATERIALS AND/OR PROCESSING OF HYDROCARBON-CONTAINING MATERIALS

CROSS REFERENCE TO RELATED APPLICATIONS

The present application is a Continuation of U.S. application Ser. No. 14/230,281, filed Mar. 31, 2014, which is a Continuation of U.S. application Ser. No. 13/777,430, filed Feb. 26, 2013 (now U.S. Pat. No. 8,685,234), which is a Divisional of U.S. application Ser. No. 12/404,016, filed Mar. 13, 2009 (now U.S. Pat. No. 8,404,108), which is a continuation-in-part of U.S. application Ser. No. 12/298,993, filed Oct. 29, 2008 (now U.S. Pat. No. 8,404,107), which is a 35 U.S.C. §371 National Phase Entry Application from PCT/US2008/010831, filed Sep. 17, 2008, and designating the United States. PCT/US2008/010831 is a Continuation-in-part of U.S. application Ser. Nos. 12/174,139, filed Jul. 16, 2008 (now U.S. Pat. No. 8,272,442), and Ser. No. 12/053,126, filed Mar. 21, 2008 (now U.S. Pat. No. 8,101,812), and claims the benefit of U.S. Provisional Application No. 60/973,964, filed Sep. 20, 2007, each of which is incorporated by reference in their entirety.

FIELD OF THE INVENTION

The present invention relates to the field of extraction of hydrocarbons from hydrocarbon-containing materials.

BACKGROUND OF THE INVENTION

The liquefaction, solubilization and/or extraction of fossil fuels, also called hydrocarbon-containing organic matter, in solid, semi-solid, highly viscous or viscous form (individually and jointly referred to as fossil fuels hereafter) have proven to be extremely challenging and difficult. As used herein, such fossils fuels include, but are not limited to, hydrocarbon-containing organic matter within coal, oil shale, tar sands and oil sands (hereinafter jointly called tar sands), as well as crude oil, heavy or extra heavy crude oil, natural gas and petroleum gas, crude bitumen, kerogen, natural asphalt and/or asphaltene. The difficulty can in part be attributed to the fact that these fossil fuels include complex organic polymers linked by oxygen and sulfur bonds, which are often imbedded in the matrices of inorganic compounds. A need exists to produce additional liquid hydrocarbon feed stock for the manufacture of liquid and gaseous fuels as well as for the production of various chemicals, pharmaceuticals and engineered materials as the demand and consumption for hydrocarbon based materials increases.

Various technologies or processes have been developed to liquefy, solubilize and/or extract the fossil fuels. None of the prior art liquefaction, solubilization and extraction technologies or processes, however, has proven to be commercially viable on a large scale for all types of fossil fuels. This is due to the fact that all of the prior art technologies and processes for the liquefaction, solubilization or extraction of hydrocarbons developed to date are expensive to deploy and operate. Additionally, the prior art processes and technologies for the liquefaction, solubilization and/or extraction of hydrocarbons may be difficult to scale up, operate and/or control because of one or more of the following reasons: (1) operating at an inordinately elevated pressure; (2) operating at a very high temperature; (3) the need for expensive processing vessels and equipment that require the external supply of hydrogen under extreme conditions; (4) being subjected to a mixture, or composition, of two or more reagents, catalysts and/or promoters, which are frequently highly toxic and are neither renewable nor recyclable; (5) requiring to supply a special form of energy, e.g., microwave radiation; (6) long process times for partial liquefaction, solubilization or extraction; (7) requiring extraordinarily fine particles with a size of about 200 mesh (0.074 mm), which is profoundly difficult and costly to manufacture and handle; and (8) being incapable of recovering and recycling the necessary reagents, catalysts and/or promoters. Thus, there exists a need to provide additional techniques and processes for the increased recovery of hydrocarbon materials.

In the past, small-scale experiments have shown that d-limonene solutions can act as solvents for hydrocarbon-containing materials. However, d-limonene is only partially successful in solubilizing hydrocarbon-containing materials. Further, because d-limonene is extracted from citrus rinds, it is available only in limited quantities and at high cost compared with other solvents.

Other solvents used in the past include alkaline solutions and alcohol-water mixtures. These compositions are only marginally useful for solubilizing hydrocarbon-containing materials due to the low solubility of hydrocarbons in aqueous solutions.

Other prior art methods utilize toluene and/or xylene to re-liquefy paraffin and thick oil to a less viscous material. Such methods re-liquefy the paraffins using one or more volatile, very dangerous, cancer causing chemicals. These products potentially pollute the ground water and must be handled with extreme caution as indicated on each chemical's Material Safety Data Sheet. The paraffin and thick oil revert to their original state once these products have revolatilized causing deposits in flow lines or storage tank "dropout".

"Sour" hydrocarbon-containing materials contain greater than about 0.5% sulfur by weight. "Sour" gas contains greater than 4 ppm $H_2S$ and other sulfonated gaseous matter. This sulfur can exist in the form of free elemental sulfur, hydrogen sulfide gas, and various other sulfur compounds, including but not limited to, sulfide, disulfides, mercaptans, thiophenes, benzothiophenes, and the like. Each crude material or gas may have different amounts or different types of sulfur compounds, but typically the proportion, complexity and stability of the sulfur compounds are greatest in heavier crude oil fractions. Hydrogen sulfide gas is a health hazard because it is poisonous. Further, hydrogen sulfide can react with water to form sulfuric acid, which can corrode equipment, pipelines, storage tanks, and the like. Thus, it is important that those sulfur-containing hydrocarbon-containing materials that are reactive be modified to reduce the corrosive effects and to avoid the health risks associated with untreated sulfur-containing hydrocarbon-containing materials.

For primary drilling operations, it would be advantageous to employ a process that would enhance solubilization and encourage movement of additional or trapped hydrocarbon-containing organic matter that could then be recovered allowing existing pressure gradients to force the hydrocarbon-containing organic matter through the borehole. In particular, it would be useful to solubilize heavier hydrocarbons that usually remain in the reservoir through primary drilling operations.

For secondary and tertiary or enhanced oil recovery operations, it would be advantageous to employ a process that would enhance solubilization of oil to recover hydrocarbon-containing organic matter in the reservoir in a manner that is cost effective and that does not damage the reservoir. While effective methods and compositions exist for tertiary operations, current methods suffer due to expense of operations in comparison to the value of the produced hydrocarbon-containing organic matter.

SUMMARY OF INVENTION

In accordance with one embodiment of the present invention, a method of extracting hydrocarbon-containing organic matter from a hydrocarbon-containing material, includes the steps of providing a first liquid including a turpentine liquid and contacting the hydrocarbon-containing material with the turpentine liquid such that an extraction mixture is formed, as well as residual material. The extraction mixture contains at least a portion of the hydrocarbon-containing organic matter and the turpentine liquid. The residual material includes non-soluble material from the hydrocarbon-containing material. The residual material can also include a reduced portion of the hydrocarbon-containing organic matter in the circumstance where all such hydrocarbon-containing material has not been solubilized by the turpentine liquid and moved into the extraction mixture. The residual material is then separated from the extraction mixture. The extraction mixture is further separated into a first portion and a second portion. The first portion of the extraction mixture includes a hydrocarbon product stream that includes at least a portion of the hydrocarbon-containing organic matter extracted from the hydrocarbon-containing material. The second portion of the extraction mixture includes at least a portion of the turpentine liquid. In one embodiment, at least a portion of the turpentine liquid is recycled to the hydrocarbon-extracting liquid.

In another embodiment, substantially all hydrocarbon-containing organic matter is extracted into the extraction mixture. In such embodiment, the residual materials are essentially oil-free and can be further used or disposed without impact to the environment.

In another embodiment, the present invention provides a method for reducing the rate of or inhibiting the corrosion of a corrodible surface or material. During transportation, drilling, downhole operations, exploration, hydrocarbon production, storage, or handling of hydrocarbon-containing material, for example by pipelines, tankers, casings, fishing tools, or drill bits, the metal surfaces that contact sulfur-containing compounds in the hydrocarbon containing materials may corrode. By reducing the corrosion rate of the corrodible surfaces, significant cost savings are realized.

DETAILED DESCRIPTION OF THE INVENTION

Figure 1:
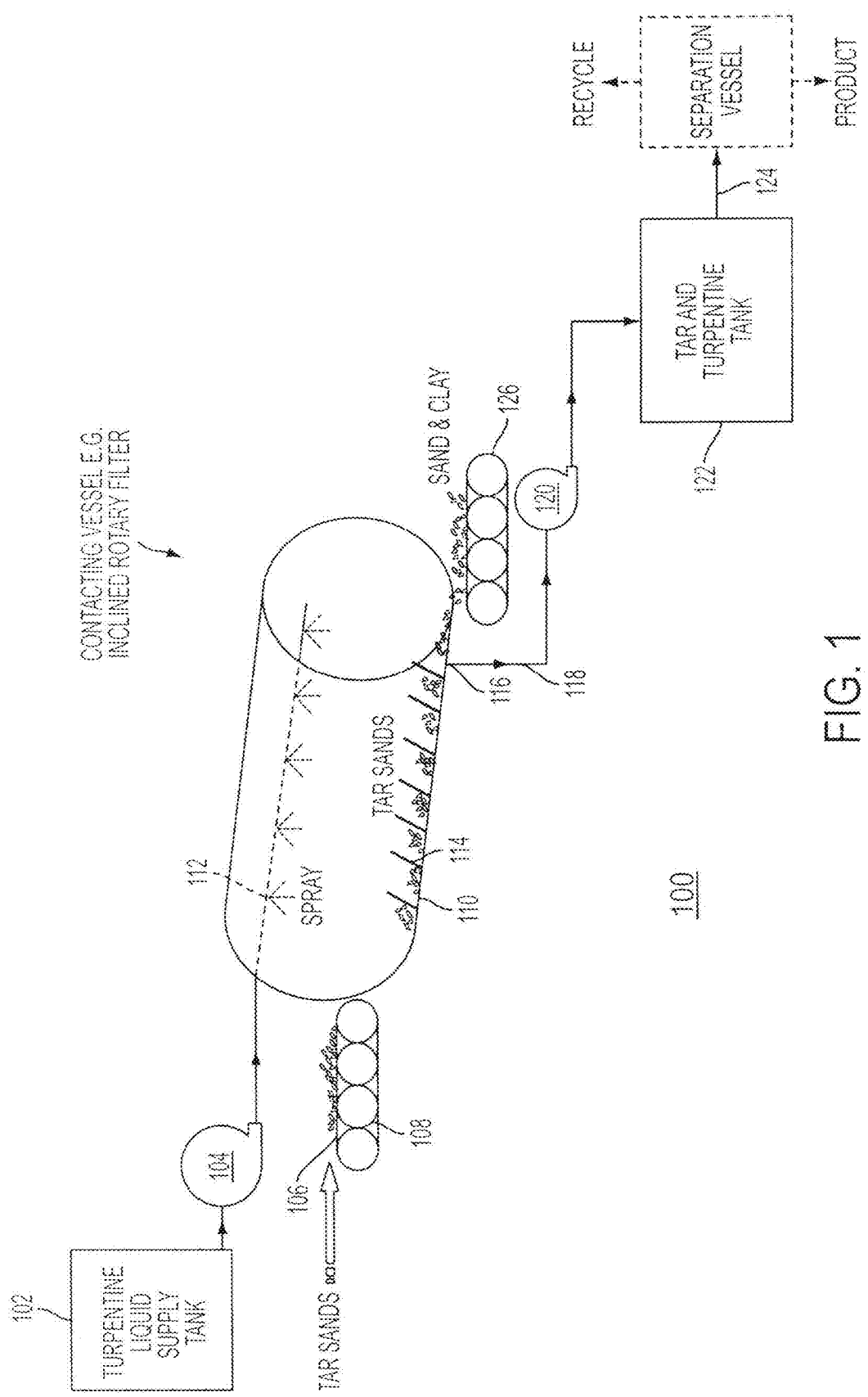
FIG. 1 is a schematic for one embodiment of an apparatus for the recovery of hydrocarbons from tar sands.

In one aspect, the present invention relates to a readily deployed composition for the extraction, liquefaction and/or solubilization of fossil fuels from coal, oil shale, tar sands and the like, as well as from reservoirs.

According to one embodiment, a method is provided including the steps of liquefying, solubilizing and/or extracting hydrocarbon-containing organic matter from a hydrocarbon-containing material, such as for example, coal, oil shale, tar sands, or a reservoir containing heavy crude oil, crude oil, natural gas (which frequently coexists with crude oils and other said fossil fuels), or a combination thereof. Hydrocarbon-containing organic matter includes, but is not limited to, heavy crude oil, crude oil, natural gas, petroleum gas, and the like. Hydrocarbon-containing organic matter can be solid, semi-solid, liquid, sludge, viscous liquid, liquid or gaseous form. Other materials that are suitable hydrocarbon-containing materials for treatment using the method of this invention include liquids and solids that include hydrocarbon-containing materials as well as a residual material. Exemplary hydrocarbon-containing materials can also include oil tank bottoms, oil pit or pond sludge and slurry mix, discarded foods, manure, sewage sludge or municipal garbage. Liquefying, solubilizing and/or extracting the hydrocarbon-containing organic matter includes the step of providing a hydrocarbon-extracting liquid, contacting the hydrocarbon-containing material with the hydrocarbon-extracting liquid so as to extract at least a portion of said hydrocarbon-containing organic matter from said hydrocarbon-containing material into said hydrocarbon-extracting liquid to create an extraction mixture that includes the hydrocarbon-containing organic matter that has been removed from the hydrocarbon-containing material and the hydrocarbon-extracting liquid, and separating the extracted organic matter in the hydrocarbon-extracting liquid from any residual material not extracted. The hydrocarbon-extracting liquid can include an amount of a turpentine liquid, such as for example, terpineol. Turpentine derived from natural sources generally includes an amount of terpene. In one embodiment, the turpentine liquid includes α-terpineol.

Another embodiment of the invention comprises contacting the hydrocarbon-containing material with a turpentine liquid mixture hereinafter referred to as the blend of turpentine liquids. The blend of turpentine liquids includes α-terpineol, β-terpineol, β-pinene, and p-cymene. In one embodiment, the multi-component turpentine liquid includes at least about 30% α-terpineol, and at least about 15% β-terpineol. In another embodiment, the blend of turpentine liquids includes about 40-60% α-terpineol, about 30-40% β-terpineol, about 5-20% β-pinene, and about 0-10% p-cymene. In another embodiment, the blend of turpentine liquids includes about 50% α-terpineol, about 35% β-terpineol, about 10% β-pinene, and about 5% p-cymene. In an alternative embodiment, a blend of turpentine liquids includes about 40-60% α-terpineol, about 30-40% α-pinene, about 5-20% β-pinene, and about 0-10% p-cymene. In another embodiment, a blend of turpentine liquids includes about 50% α-terpineol, about 35% α-pinene, about 10% β-pinene, and about 5% p-cymene.

In certain embodiments, the ratio of turpentine liquid to hydrocarbon-containing material is in a range of about 1:2 and 6:1 by weight, or in a range of about 1:2 and 4:1 by weight. In another embodiment the ratio of turpentine liquid to hydrocarbon-containing material is in a range of about 1:1 and 3:1 by weight. In embodiments relating to reservoir recovery, the ratio can be greater than or equal to about 3:1, and in other embodiments relating to reservoir recovery the ratio can be greater than or equal to about 4:1. For purposes of extraction from a reservoir, pore volume is used to determine an estimated measure of the hydrocarbon-containing material. In other aspects of this invention, such as in the use of tar sands and coal and oil shale, volume of the hydrocarbon-containing material can be more directly estimated.

In certain embodiments, the minimum organic matter contained in the hydrocarbon-containing material is greater than or equal to about 1% by weight, in other embodiments greater than or equal to about 10% by weight, and in still further embodiments greater than or equal to about 14% by weight of the hydrocarbon-containing material.

Tar sands, coal, oil shale, natural gas, kerogen, bitumen, asphalt, as used herein, can contain as little as about 1% naturally occurring hydrocarbon-containing organic matter. The methods and liquids described are operable to extract up to about 100% of the hydrocarbon-containing organic matter from hydrocarbon-containing materials containing very low to very high amounts of hydrocarbons (i.e., material that includes as little as about 1% by weight hydrocarbon material to material that includes up to about 100% by weight hydrocarbon material).

In one embodiment of the invention, a liquefaction, solubilization or extraction reagent of choice for the hydrocarbon-containing matter is a natural, synthetic or mineral turpentine, which can include α-terpineol, or be α-terpineol itself.

In certain embodiments, the liquefaction, solubilization and/or extraction of fossil fuels or hydrocarbon-containing organic matter can be carried out at a temperature within the range of about 2° C. to about 300° C. In certain embodiments, the organic matter or material is contacted with a turpentine liquid at a temperature of less than about 300° C., or less than about 60° C. In other embodiments, the liquefaction, solubilization and/or extraction temperatures can be within the range of about 20° C. to about 200° C. The pressure under which the liquefaction, solubilization and/or extraction of fossil fuels is to be carried out may typically be within the range of about $1.0 \times 10^4$ Pascals (0.1 atm) to about $5.0 \times 10^6$ Pascals (50.0 atm). In certain embodiments, the process can be conducted at a pressure between about $5.0 \times 10^4$ Pascals (0.5 atm) to about $8.0 \times 10^5$ Pascals (8.0 atm). In certain other embodiments, the fossil fuels or hydrocarbon-containing organic matter to be liquefied, solubilized and/or extracted by immersion in, or contact with, one or more turpentine liquid can be in the form of particles, pieces, chunks or blocks of fossil fuels whose sizes are within the range of about 0.74 mm to about 10 mm into the interior portion of a liquefaction, solubilization or extraction vessel (hereafter also referred to as the reactor or contacting vessel interchangeably) that contains one or more of the said liquefaction, solubilization and/or extraction reagents. In certain embodiments, the sizes of the particles, pieces, chunks or blocks of fossil fuels are within the range of about 0.149 mm (100 mesh) to about 20 mm. In certain embodiments, the particles, pieces, chunks or blocks of fossil fuels are agitated by passing the liquefaction, solubilization and/or extraction reagent or reagents in the form of liquid through the particles, pieces, chunks or blocks by boiling the reagent or reagents. In certain embodiments, the duration of liquefaction, solubilization and/or extraction is from about 1 minute to about 90 minutes. The fossil fuels can be partially or fully liquefied, solubilized and/or extracted; the degree of liquefaction, solubilization and/or extraction can be effected by controlling the operating conditions, such as temperature, pressure, intensity of agitation and duration of operation, and/or adjusting the type, relative amount and concentration of the liquefaction, solubilization or extraction reagent or reagents in the reactor.

The basis of one aspect of the present invention is the unexpected discovery that when about 500 grams of the reagent, α-terpineol, were added to about 250 grams of a sample of coal having a particle diameter of less than about 25 mm from the Pittsburgh seam in Washington County of Pennsylvania in a tray, the reagent's color turned pitch black almost immediately, and remained so after several hours. This indicated that the color change was not due to the suspension of the coal particles, but rather was indicative of the extraction of hydrocarbon-containing organic matter from the coal. Subsequently, this 2:1 mixture of α-terpineol and the coal sample was transferred from the tray to a capped and tightly sealed jar and was maintained under the ambient conditions of about 20° C. and slightly less than about $1.01 \times 10^5$ Pascals (1 atm) for about 25 days. The conversion, (i.e., the degree of liquefaction), of the coal sample was determined to be about 71 wt. % after filtering, washing with ethanol, drying, and weighing. This 71 wt. % conversion corresponds to nearly all the solubilizable bitumen (organic matter) present in the coal sample whose proximate analyses are 2.00 wt. % of as-received moisture, 9.25 wt. % of dry ash, 38.63 wt. % of dry volatile matter, and 50.12 wt. % of dry fixed carbon. A series of subsequent experiments with coal, as well as oil shale and tar sands under various operating conditions, has shown that the family of reagents that includes natural and/or synthetic turpentines containing pinenes, and alcohols of pinene, i.e., terpineols, are inordinately effective in liquefying, solubilizing and/or extracting kerogen (organic matter), bitumen (organic matter) and/or asphaltene (organic matter) in the fossil fuels, including coal, oil shale, tar sands, heavy crude oil and/or crude oil, without requiring the aid of any catalyst or alkaline metals. These reagents, except mineral turpentine that is derived from petroleum, are renewable and "green," i.e., low in toxicity, and relatively inexpensive, as compared to all other known liquefaction, solubilization and/or extraction reagents for the fossil fuels, such as tetraline, xylene, anthracene, and various solutions or mixtures of these reagents with other compounds. Even mineral turpentine derived from petroleum, although not renewable, is relatively low in toxicity, inexpensive, and recyclable. It was also found that any of the said liquefaction, solubilization and/or extraction reagents penetrates or diffuses into the particles, pieces, blocks or chunks of fossil fuels through their pores at appreciable rates, thus causing these particles, pieces, chunks or blocks to subsequently release the liquefiable, solubilizable or extractable fraction in them often almost nearly completely even under the far milder conditions, e.g., ambient temperature and pressure, than those required by the recent inventions pertaining to the liquefaction, solubilization and/or extraction of the fossil fuels, such as coal, oil shale, tar sands, crude oil and heavy crude oil.

An aspect of the present invention provides a method of liquefying, solubilizing and/or extracting the fossil fuels or hydrocarbon-containing organic matter from hydrocarbon-containing material, such as coal, oil shale and tar sands, wherein a portion of solid or semi-solid fossil fuels is contacted with a turpentine liquid in an extraction mixture, which can be in an absence of an alkali metal, catalyst, hydrogen ($H_2$) and/or carbon monoxide (CO). While hydrogen and CO can be useful as a mixing agent, one embodiment of the invention includes the process and the composition in the absence of hydrogen and CO.

In certain embodiments, the turpentine liquid is selected from natural turpentine, synthetic turpentine, mineral turpentine, pine oil, α-pinene, β-pinene, α-terpineol, β-terpineol, γ-terpineol, polymers thereof, and mixtures thereof. In certain other embodiments, the turpentine liquid is selected from geraniol, 3-carene, dipentene (p-mentha-1,8-diene), nopol, pinane, 2-pinane hydroperoxide, terpin hydrate, 2-pinanol, dihydromycenol, isoborneol, p-menthan-8-ol, α-terpinyl acetate, citronellol, p-menthan-8-yl acetate, 7-hydroxydihydrocitronellal, menthol, and mixtures thereof. In other embodiments, the turpentine liquid is selected from anethole, camphene; p-cymene, anisaldeyde, 3,7-dimethyl-1,6-octadiene, isobornyl acetate, ocimene, alloocimene, alloocimene alcohols, 2-methoxy-2,6-dimethyl-7,8-epoxyoctane, camphor, citral, 7-methoxydihydro-citronellal, 10-camphorsulphonic acid, cintronellal, menthone, and mixtures thereof.

The present invention avoids the environmental, economic, and practical disadvantages that have plagued prior extraction systems. To date, solvents comprising various surfactants, surface active agents, alkaline or acidic solutions, salts, volatile organic compounds, and alcohols have been used with varying degrees of success. However, each of these known solvent formulations may have certain drawbacks that one or more embodiments of the current invention overcome. In one embodiment, the renewable and "green" extraction liquids of the present invention are naturally derived and substantially surfactant-free. In another embodiment, the extraction liquids are surfactant-free. Further, the use of the extraction liquids of the present invention for extracting hydrocarbon-containing organic matter from naturally occurring geological formations avoids the economic and environmental costs associated with other known liquefaction, solubilization and/or extraction reagents for fossil fuels.

In certain embodiments, an aspect of the present invention provides a method for extracting hydrocarbon-containing materials using a substantially surfactant-free non-aqueous liquid comprising a turpentine liquid. Non-aqueous solvents have the advantage of less leakage into the environment, increased extraction of hydrocarbons, avoidance of sulfuric acid formation upon contacting hydrogen sulfide gases and other reactive sulfur compounds trapped within hydrocarbon containing materials, corrosion inhibition, viscosity reduction, and capillary effect elimination.

According to an aspect, solid or semi-solid fossil fuels or other hydrocarbon-containing materials, such as coal, oil shale, tar sands and heavy crude oil, or for example oil tank bottoms, oil pit or pond sludge, discarded foods, manure, sewage sludge or municipal garbage, may be provided in any size that facilitates contact with a turpentine liquid. The fossil fuels or hydrocarbon-containing materials can be provided as particles, pieces, chunks, or blocks, for example, large fragments or pieces of coal or oil shale. According to a certain aspect of the invention, the fossil fuel or hydrocarbon-containing material is provided as particles. According to a certain aspect of the invention, the particles of fossil fuel or hydrocarbon-containing materials have an average particle size of from about 0.01 mm to about 100 mm. In certain other embodiments, the particles of fossil fuel have an average particle size from about 4 mm to about 25 mm.

According to an aspect of the present invention, a second liquid can be added to the turpentine liquid. According to a certain aspect of the invention, the second liquid can be selected from lower aliphatic alcohols, alkanes, aromatics, aliphatic amines, aromatic amines, carbon bisulfide and mixtures thereof. Exemplary mixtures include solvents manufactured in petroleum refining, such as decant oil, light cycle oil and naphtha, or solvents manufactured in dry distilling coal and fractionating liquefied coal.

As used herein, lower aliphatic alcohols refers to primary, secondary and tertiary monohydric and polyhydric alcohols of between 2 and 12 carbon atoms. As used herein, alkanes refers to straight chain and branched chain alkanes of between 5 and 22 carbon atoms. As used herein, aromatics refers to monocyclic, heterocyclic and polycyclic compounds. As used herein, aliphatic amines refers to primary, secondary and tertiary amines having alkyl substituents of between 1 and 15 carbon atoms. In certain embodiments, benzene, naphthalene, toluene or combinations thereof are used. In another embodiment, the lower aliphatic alcohols noted above can be used. In one embodiment the solvent is selected from ethanol, propanol, isopropanol, butanol, pentane, heptane, hexane, benzene, toluene, xylene, naphthalene, anthracene, tetraline, triethylamine, aniline, carbon bisulfide, and mixtures thereof, at a temperature and pressure operable to maintain the solvent in liquid form.

In certain embodiments, the ratio of turpentine liquid to any other turpentine-miscible solvent contained in said fluid is greater than or equal to about 1:1, in certain embodiments greater than or equal to about 9:4. In certain embodiments, the ratio is greater than or equal to about 3:1. In yet other embodiments, the ratio is greater than or equal to about 4:1.

According to an aspect of the present invention, the fossil fuel and the turpentine liquid are contacted at a temperature of from about 2° C. to about 300° C. In certain embodiments, the fossil fuel is contacted by the turpentine liquid at a temperature of less than about 200° C.

According to a further aspect of the present invention, the fossil fuel and the turpentine liquid are contacted at a pressure of from about $1.0\times10^4$ Pascals (0.1 atm) to about $5.0\times10^6$ Pascals (50 atm). According to an aspect, the method is executed at a pressure of from about 0.5 atm to about 8 atm.

According to an aspect of the present invention, the method further includes providing an extraction vessel within which the solid or semi-solid fossil fuel is contacted with the turpentine liquid. According to an aspect, agitation means can be provided whereby the fossil fuel and the turpentine liquid contained within the reactor or extractor vessel are mixed and agitated.

According to an aspect of the present invention, the fossil fuel and turpentine liquid can be incubated in a holding tank, a pipeline, or other appropriate vessel so as to prolong their contact time. According to a further aspect, the degree of liquefaction, solubilization and/or extraction is controlled by the length of time the solid or semi-solid fossil fuel is in contact with the turpentine liquid and/or the temperature of the mixture of the fossil fuel and turpentine liquid.

According to an aspect of the present invention, the fossil fuel is contacted with a heterogeneous liquid including a turpentine liquid and boiling water as an agitant. The bubbling action of boiling water causes agitation thereby increasing the contact surface between the fossil fuel and the turpentine liquid. Thus, as a result, a higher degree of extraction is observed. After extraction, the hydrocarbon-containing turpentine liquid may be separated from water using the difference in liquid densities, e.g. in a settling tank, decanter, or other separation means known in the art.

In certain embodiments, the ratio of turpentine fluid to water is greater than or equal to about 1:1 by volume, to avoid slurry formation, which may render separation of the extracted organic matter in the turpentine liquid-containing fluid difficult.

According to an aspect of the present invention, the fossil fuel is contacted by the turpentine liquid in the presence of an energy input selected from thermal energy in excess of about 300° C., pressure in excess of 50 atm, microwave energy, ultrasonic energy, ionizing radiation energy, mechanical shear-forces, and mixtures thereof.

According to an aspect of the present invention, a liquefaction or solubilization catalyst is provided to the mixture of fossil fuel and turpentine liquid.

According to an aspect of the present invention, the reaction or solubilization mixture is supplemented by the addition of a compound selected from hydrogen, carbon monoxide, water, metal oxides, metals, and mixtures thereof.

According to an aspect of the present invention, a microorganism is included in the reaction or solubilization mixture. Select chemical bonds, for example, sulfur cross-links and oxygen cross-links, in the hydrocarbons of fossil fuels and other hydrocarbon-containing materials are broken by biotreatment with *bacillus*-type thermophilic and chemolithotrophic microorganisms selected from naturally occurring isolates derived from hot sulfur springs. The breaking of these select chemical bonds facilitates the solubilization of hydrocarbons in fossil fuels and other hydrocarbon-containing materials.

In accordance with one embodiment of the present invention, a method is provided for extracting hydrocarbon-containing organic matter from a hydrocarbon-containing material comprising a viscous liquid, liquid or gaseous fossil fuel material. The method provides a first liquid that includes a turpentine liquid. The turpentine liquid is contacted with the hydrocarbon-containing material in-situ in an underground formation containing said fossil fuel material, thereby forming an extraction mixture so as to extract hydrocarbon-containing organic matter into said turpentine liquid and form an extraction liquid. The extraction liquid is removed from said formation, wherein the extraction liquid includes the turpentine liquid containing the extracted hydrocarbon-containing organic matter. The extracted hydrocarbon-containing organic matter is separated from a residual material not extracted. The method can further include separating said extracted hydrocarbon-containing organic material from the turpentine liquid. The viscous liquid, liquid or gaseous fossil fuel material can be heavy crude oil, crude oil, natural gas, or a combination thereof. The underground formation may be a crude oil reservoir or a natural gas reservoir, for example.

The present invention can be deployed readily in-situ to liquefy and/or solubilize directly the fossil fuels in underground formations, and extract the resulting liquid products from such formations.

An exemplary extraction reagent of the present invention may be a fluid, e.g. a liquid, which may have a very strong physicochemical affinity with bituminous organic matter, including bitumen, kerogen and/or tar, in coal, oil shale and tar sands. When the extraction reagent of the present invention and bituminous organic matter comprising mainly hydrocarbons come into direct contact with each other, the organic matter is extracted into the extraction reagent of the present invention, thereby liquefying the organic matter. Upon contact, the hydrocarbons and the extraction reagent of the present invention rapidly form a homogeneous solution, i.e., a one-phase liquid.

It is possible to take advantage of the physicochemical affinity between the extraction reagent of the present invention and the bituminous matter for enhancing oil recovery from oil reservoirs under in-situ conditions. The prior art in-situ recovery techniques applied to-date in oil reservoirs resort mostly to the so-called frontal displacement method. This process is strictly controlled by the characteristics of the multi-phase fluid flow in a porous medium. This tends to leave a large portion, often exceeding about 40% of the original oil, unrecovered from the formation, even for the "good" low viscosity oil reservoirs. The extraction reagent of the present invention enhances oil recovery by overcoming the complex behavior of prior multi-phase flow techniques prevailing under in-situ conditions.

The present invention provides an improved method for increasing flowability and extraction of viscous or immobile hydrocarbon containing materials by contacting a hydrocarbon-containing material with a turpentine liquid, which decreases the viscosity of the hydrocarbon-containing material. Flow is also enhanced by the non-aqueous nature of the turpentine liquid due to elimination of the capillary effect associated with aqueous solutions. Contacting can take place in situ or ex situ.

The present invention takes advantage of the very strong physico-chemical affinity of the turpentine liquid.

One method of the present invention injects an extraction reagent of the present invention into an oil or natural gas reservoir through an injection well.

Oil is extracted into the extraction reagent of the present invention when the two come into contact in an oil reservoir, thereby yielding a homogeneous solution, i.e., a one-phase liquid. The extraction reagent of the present invention does not simply displace the oil as it travels from the injection well to a production well in fluid communication with an underground formation. Rather, extraction of previously trapped oil into the extraction reagent of the present invention continues until the extraction reagent is completely exhausted in forming the homogeneous solution with oil. Thereafter, this homogeneous solution that includes the extracted hydrocarbons then simply flows through the pores of the reservoir as a one-phase liquid, eventually reaching a production well.

The following examples illustrate three specific embodiments of in-situ methods for oil recovery of the present invention.

In a first in-situ embodiment, between about three (3.0) to seven (7.0) pore volumes of an extraction reagent of the present invention are injected into an oil reservoir that has previously been water-flooded to the residual oil saturation while producing about 51% of the original oil in the reservoir. The subsequent injection of the extraction reagent can unexpectedly produce about an additional 41% of the original oil in the reservoir. This embodiment of the method was experimentally validated, as described in Example 22 herein below.

In a second in-situ embodiment, between about two (2.0) to five (5.0) pore volumes of an extraction reagent of the present invention are injected into an oil reservoir. At the outset, injection of the extraction reagent causes only oil to be produced until about one-third (0.3) to three-quarter (0.75) of pore volume of the extraction reagent of the present invention is injected; thereafter, the extraction reagent of the present invention into which oil has been extracted, is produced. The majority of the oil present can be recovered upon injecting between about one and a half (1.5) to three and a half (3.5) total pore volumes of the reagent. The method unexpectedly recovers about 90% of the original oil in the reservoir. This embodiment of the method also is experimentally validated, as described in Example 22 herein below.

In a third in-situ embodiment, an extraction reagent of the present invention is injected to improve the oil recovery from oil reservoirs containing very viscous oil, e.g., the reservoirs of the "Orinoco Oil Belt" in Venezuela. The recovery factor for extra heavy oil with prior art recovery methods is low, typically ranging from about 10% to about 15% of the original oil in such reservoirs. The unexpected increase in the recovery efficiency from these reservoirs with injection of the turpentine liquid extraction reagent of the present invention can be further enhanced by adopting horizontal wells for both production and injection wells, and periodic steam soaking of these wells.

Ultimate recovery of natural gas from a large gas reservoir can be increased with the injection of an extraction reagent of the present invention into a reservoir. The gas production from such a reservoir often creates dangerously large-scale subsidence on the surfaces of the gas field, e.g., the "Groeningen" field in the Netherlands. As such, it is frequently necessary that the reservoir pressure be maintained by water injection. Water injected into the reservoir can trap up to about 30% of the gas in-situ at high pressure due to the two-phase flow of water and gas through the reservoir with a low permeability. With the injection of an extraction reagent of the present invention, however, the trapped gas in the reservoir is extracted into the reagent and flows to the production wells. By separating the reagent and gas at the surface, the gas is recovered and the reagent is recycled for reuse.

The extraction methods of the present invention can be implemented after one or more of the known methods for facilitating oil production, e.g., $CO_2$ or natural gas injection and surfactant addition, are executed.

Still other aspects and advantages of the present invention will become easily apparent by those skilled in the art from this description, wherein certain embodiments of the invention are shown and described simply by way of illustration of the best mode contemplated of carrying out the invention. As will be realized, the invention is capable of other and different embodiments, and its several details are capable of modifications in various obvious respects, without departing from the invention. Accordingly, the description is to be regarded as illustrative in nature and not as restrictive.

EXEMPLARY EMBODIMENTS FOR CARRYING OUT THE INVENTION

Coal

In certain embodiments, anthracite or bituminous coal can be ground to sizes ranging from about 0.841 mm (20 mesh) to about 0.149 mm (100 mesh), and subsequently be solubilized and/or extracted, i.e., liquefied, by immersing in a turpentine liquid under a pressure within the range of about $1.0 \times 10^5$ Pascals (1 atm) to about $2.0 \times 10^5$ Pascals (2.0 atm). In certain other embodiments, the turpentine liquid can be natural, synthetic or mineral turpentine that includes up to about 50-70 volume % of α-terpineol, about 20-40 volume % of β-terpineol, and about 10 volume % of other components. As defined herein, the term "other components" can include natural turpentine, synthetic turpentine, mineral turpentine, pine oil, α-pinene, β-pinene, α-terpineol, β-terpineol, γ-terpineol, terpene resins, α-terpene, β-terpene, γ-terpene, and mixtures thereof. In other embodiments, the turpentine liquid can include at least one compound selected from geraniol, 3-carene, dipentene (p-mentha-1,8-diene), nopol, pinane, 2-pinane hydroperoxide, terpin hydrate, 2-pinanol, dihydromycenol, isoborneol, p-menthan-8-ol, α-terpinyl acetate, citronellol, p-menthan-8-yl acetate, 7-hydroxydihydrocitronellal, menthol, and mixtures thereof. In yet other embodiments, the turpentine liquid can include at least one compound selected from anethole, camphene; p-cymene, anisaldeyde, 3,7-dimethyl-1,6-octadiene, isobornyl acetate, ocimene, alloocimene, alloocimene alcohols, 2-methoxy-2,6-dimethyl-7,8-epoxyoctane, camphor, citral, 7-methoxydihydrocitronellal, 10-camphorsulphonic acid, cintronellal, menthone, and/or mixtures thereof. In certain embodiments, the bed of ground anthracite or bituminous coal can be agitated by passing said turpentine liquid at a temperature in the range between 80° C. and about 130° C., or possibly up to the boiling point of said turpentine liquid. In certain other embodiments, the duration of solubilization and/or extraction, i.e., liquefaction, can be within about 10 minutes to about 40 minutes. In certain embodiments, the contact time for the extraction of hydrocarbon-containing organic matter from coal is less than about 5 minutes.

In some embodiments, lignite, brown coal, or any other low-rank coals can be ground to sizes ranging from about 0.419 mm (40 mesh) to about 0.074 mm (200 mesh), and subsequently be solubilized and/or extracted, i.e., liquefied, by immersing in a turpentine liquid under a pressure within the range of about $1.0 \times 10^5$ Pascals (1 atm) to about $2.0 \times 10^5$ Pascals (2.0 atm). In certain other embodiments, the turpentine liquid can be natural, synthetic or mineral turpentine that includes about 70-90 volume % of α-terpineol, about 5-25 volume % of β-terpineol, and about 5 volume % of other components. In other embodiments, the bed of ground lignite, brown coal, or any other low-rank coals can be agitated by passing said turpentine liquid at a temperature in the range between about 80° C. and about 130° C., or possibly up to the boiling point of said turpentine liquid. In certain other embodiments, the solubilization and/or extraction, i.e., liquefaction, can be within about 20 minutes to about 60 minutes. In certain embodiments, the contact time for the extraction of hydrocarbon-containing organic matter from coal is less than about 5 minutes.

Oil Shale

In certain embodiments, oil shale can be ground to sizes ranging from about 0.419 mm (40 mesh) to 0.074 mm (200 mesh), and subsequently be solubilized and/or extracted, i.e., liquefied, by immersing in a turpentine liquid under a pressure within the range of about $1.0 \times 1.0^5$ Pascals (1 atm) to about $2.0 \times 10^5$ Pascals (2.0 atm). In other embodiments, the turpentine liquid can be natural, synthetic or mineral turpentine that includes about 70-90 volume % of α-terpineol, about 5-25 volume % of β-terpineol, and about 5 volume % of other components. In certain other embodiments, the bed of ground oil shale can be agitated by passing said turpentine liquid at a temperature in the range between about 80° C. and about 130° C., or possibly up to the boiling point of said turpentine liquid. In other embodiments, the solubilization and/or extraction, i.e., liquefaction, can be within about 30 minutes to about 60 minutes. In certain embodiments, the contact time for the extraction of hydrocarbon-containing organic matter from oil shale is less than 5 minutes.

Tar Sands

In certain embodiments, tar sands can be broken up to sizes ranging from about 25.4 mm (1 mesh) to 4.76 mm (4 mesh), and subsequently be solubilized and/or extracted, i.e., liquefied, by immersing in a turpentine liquid under a pressure within the range of about $1.0 \times 1.0^5$ Pascals (1 atm) to about $2.0 \times 10^5$ Pascals (2.0 atm). In other embodiments, the turpentine liquid can be natural, synthetic or mineral that includes containing about 40-60 volume % of α-terpineol, about 30-50 volume % of β-terpineol, about 5 volume % of α and/or β-pinene and about 5 volume % of other components. In another embodiment, a bed of ground oil shale can be agitated by passing said turpentine liquid at a temperature in the range between about 60° C. and about 90° C., or possibly up to the boiling point of said turpentine liquid. In other embodiments, the solubilization and/or extraction, i.e., liquefaction, can be within about 10 minutes to about 30 minutes. In certain embodiments, the contact time for the extraction of hydrocarbon-containing organic matter from tar sands is less than 5 minutes.

Crude Oil

In certain embodiments, light and medium crude oil can be produced in situ, i.e., removed from an underground reservoir, for primary, secondary or tertiary recovery, by injecting about one (1.0) to about five (5.0) pore volumes of a turpentine liquid. In other embodiments, between about two (2.0) and about four (4.0) pore volumes of a turpentine liquid can be injected. In certain embodiments, the turpentine liquid can be natural, synthetic or mineral turpentine that includes about 40-70 volume % of α-terpineol, about 30-40 volume % of β-terpineol, about 10 volume % of α and/or β-pinene and about 10 volume % of other components. In certain embodiments, the injection of a turpentine liquid can be followed by waterflooding with about one (1.0) to about three (3.0) pore volumes of water.

In certain embodiments, heavy and extra heavy crude oil can be produced in situ, i.e., removed from an underground reservoir, for primary, secondary or tertiary recovery, by injecting about one (1.0) to about five (5.0) pore volumes of a turpentine liquid. In other embodiments, between about two (2.0) and about four (4.0) pore volumes of a turpentine liquid can be injected. In certain embodiments, the turpentine liquid can be natural, synthetic or mineral turpentine that includes about 50-70 volume % of α-terpineol, about 20-35 volume % of β-terpineol, about 10 volume % of α and/or β-pinene and about 5 volume % of other components. In other embodiments, the method can be used in conjunction with steam injection prior to, during, or after injection of the hydrocarbon-extracting liquids.

Referring to FIG. 1, an apparatus for the recovery of hydrocarbon-containing organic matter from tar sands is provided. Apparatus 100 includes turpentine liquid supply 102, which can optionally be coupled to a pump 104, to supply a turpentine liquid to contacting vessel or extraction vessel 110. In certain embodiments, the turpentine liquid supply can include means for heating the turpentine liquid. In certain embodiments, the contacting vessel can be an inclined rotary filter or trommel. Tar sands sample 106 is provided to conveyor 108 or like feeding apparatus for supplying the tar sands to an inlet of contacting vessel 110. Optionally, conveyor 108 can include a filter screen or like separating apparatus to prevent large particles from being introduced into the process. Contacting vessel 110 includes at least one inlet for turpentine liquid to be introduced and contacted with the tar sands. Contacting vessel 110 can include a plurality of trays or fins 114 designed to retain the tar sands in the contacting vessel for a specified amount of time, and to increase or control contact between the tar sands particles and the turpentine liquid. In certain embodiments, the contacting vessel can be an inclined rotary filter. An extraction mixture that includes the extracting liquid and hydrocarbon-containing organic matter extracted from the tar sands is removed from contacting vessel 110 via outlet 116, which can include filter 118 to prevent the removal of solids with the extraction mixture that includes the extracted hydrocarbon-containing organic matter. Pump 120 can be coupled to outlet 116 to assist with supplying the extraction mixture to holding tank 122. Line 124 can be coupled to holding tank 112 for supplying the extraction mixture for further processing. After extraction of the hydrocarbon-containing organic matter, inorganic solids and other materials not soluble in the turpentine liquid can be removed from the contacting vessel via second conveyor 126. Turpentine liquids operable for the recovery of hydrocarbons from tar sands utilizing apparatus 100 can include, but are not limited to, liquids that include α-terpineol and β-terpineol.

Figure 2:
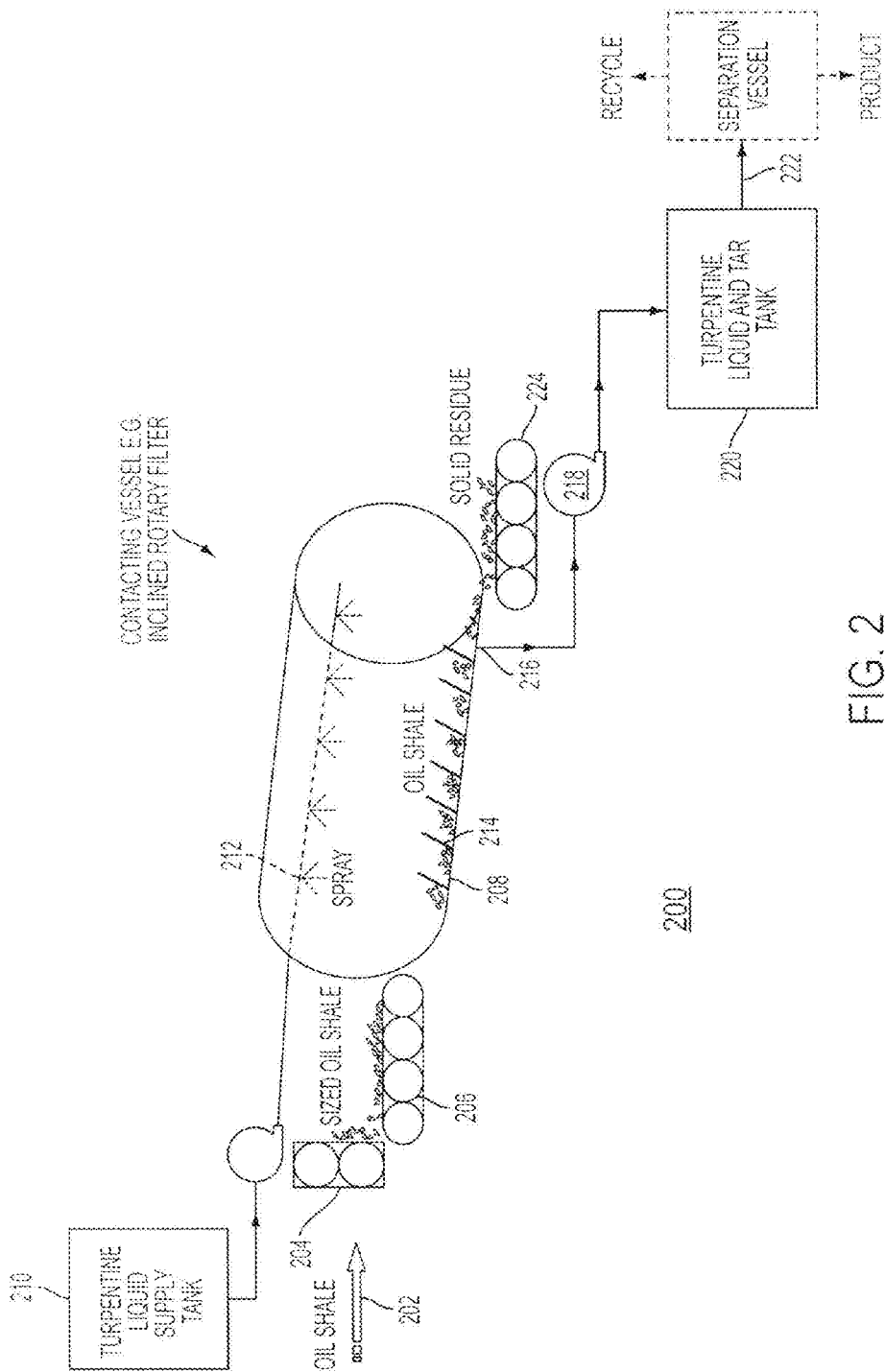
FIG. 2 is a schematic for one embodiment of an apparatus for the recovery of hydrocarbons from oil shale.

Referring now to FIG. 2, apparatus 200 is provided for the recovery of hydrocarbon-containing organic matter from oil shale and other sedimentary rock formations that include recoverable hydrocarbon materials. Oil shale sample 202 is supplied to grinder or crusher 204 to reduce the size of the oil shale. In one embodiment, grinder or crusher 204 reduces the oil shale to between about 0.074 and 0.42 mm in diameter. Crushed oil shale may optionally be supplied to a filter to ensure uniform and/or conforming particle size. First conveyor 206 provides particles from grinder or crusher 204 to contacting vessel 208. Contacting vessel 208 is coupled to turpentine liquid supply 210, which may optionally be coupled to a pump, and which supplies a turpentine liquid to at least one inlet 212 coupled to contacting vessel 208. In certain embodiments, the turpentine liquid supply can include means for heating the turpentine liquid. Contacting vessel 208 can include a plurality of trays or fins 214 designed to retain the tar sands in the contacting vessel for a specified amount of time, and to increase or control contact between the tar sands particles and the turpentine liquid. In certain embodiments, the contacting vessel can be an inclined rotary filter or trommel. An extraction mixture stream that includes the turpentine liquid and recovered hydrocarbon-containing organic matter from the oil shale is collected via outlet 216 and supplied to holding tank 220. Pump 218 is optionally coupled to outlet 216 to assist with the supply of the extraction mixture stream to holding tank 220. The extraction mixture stream can be coupled to line 222 for supplying the extraction mixture stream to further processing. Second conveyor 224 assists with the removal of inorganic or insoluble materials from contacting vessel 208. Turpentine liquids operable for the recovery of hydrocarbons from oil shale utilizing apparatus 200 can include, but are not limited to, α-terpineol and β-terpineol.

Figure 3:
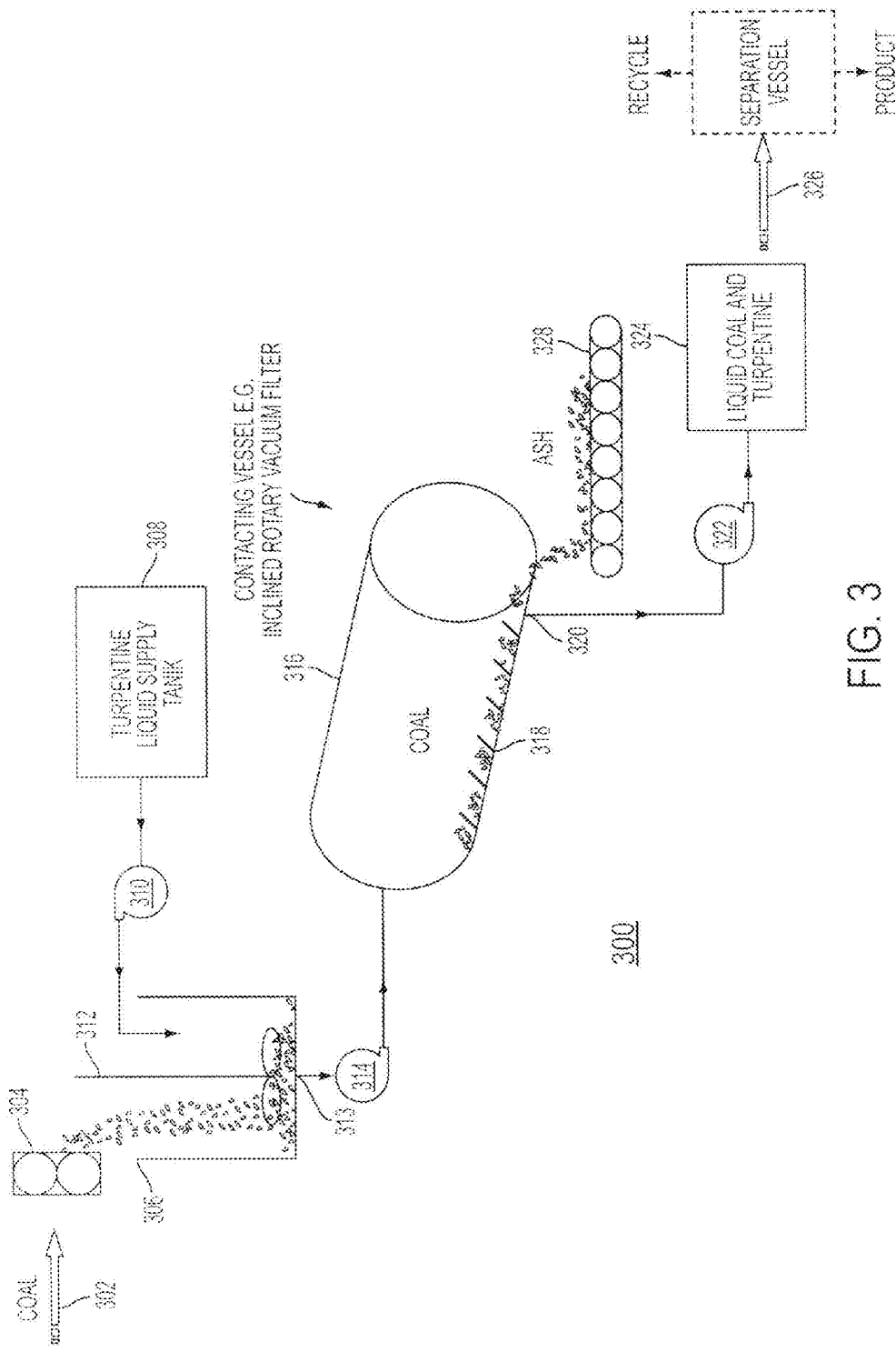
FIG. 3 is a schematic for one embodiment of an apparatus for the recovery of hydrocarbons from coal.

Referring now to FIG. 3, apparatus 300 is provided for the recovery of hydrocarbon-containing organic matter from coal. Coal sample 302 is supplied to grinder or crusher 304 to reduce the size of the coal. In one embodiment, grinder or crusher 304 reduces the coal to between about 0.01 and 1 mm in diameter, depending upon the quality of the coal sample. In certain embodiments, the grinder or crusher 304 can be a wet grinder. Crushed coal may optionally be supplied to a filter to ensure uniform and/or conforming particle size. Crushed coal is supplied to first contacting vessel 306. First contacting vessel 306 is also coupled to a turpentine liquid supply 308, which may optionally be coupled to pump 310, and which supplies the turpentine liquid to first contacting vessel 306. In certain embodiments, the turpentine liquid supply can include means for heating the turpentine liquid. First contacting vessel 306 includes mixing means 312 designed to agitate and improve or control contact between the solid coal particles and the turpentine liquid. An extraction mixture stream that includes the turpentine liquid and recovered hydrocarbon-containing organic matter from the oil shale is collected via first contacting vessel outlet 313 and supplied to second contacting vessel 316. Pump 314 is optionally coupled to outlet 313 to assist with the supply of the extraction mixture stream to the second contacting vessel 316. Second contacting vessel 316 can include a series of trays or fins 318 designed to increase or control separation of the solids and turpentine liquids. Optionally, the second contacting vessel 316 can be an inclined rotary filter or trommel. The extraction mixture stream can be collected from second contacting vessel outlet 320, which may optionally be coupled to pump 322, to assist with supply of the extraction mixture stream to holding tank 324. Liquid coal and any turpentine liquid present in holding tank 324 can be supplied to a liquid coal refinery or other processing step via line 326. Conveyor 328 can be coupled to second contacting vessel 316 for removal and recovery of the solids as a by-product of the process. Turpentine liquids operable for the recovery of hydrocarbons from coal utilizing apparatus 300 can include, but are not limited to, α-terpineol and β-terpineol. The apparatus 300 can also be used to process high and low grade oil shale.

Figure 4:
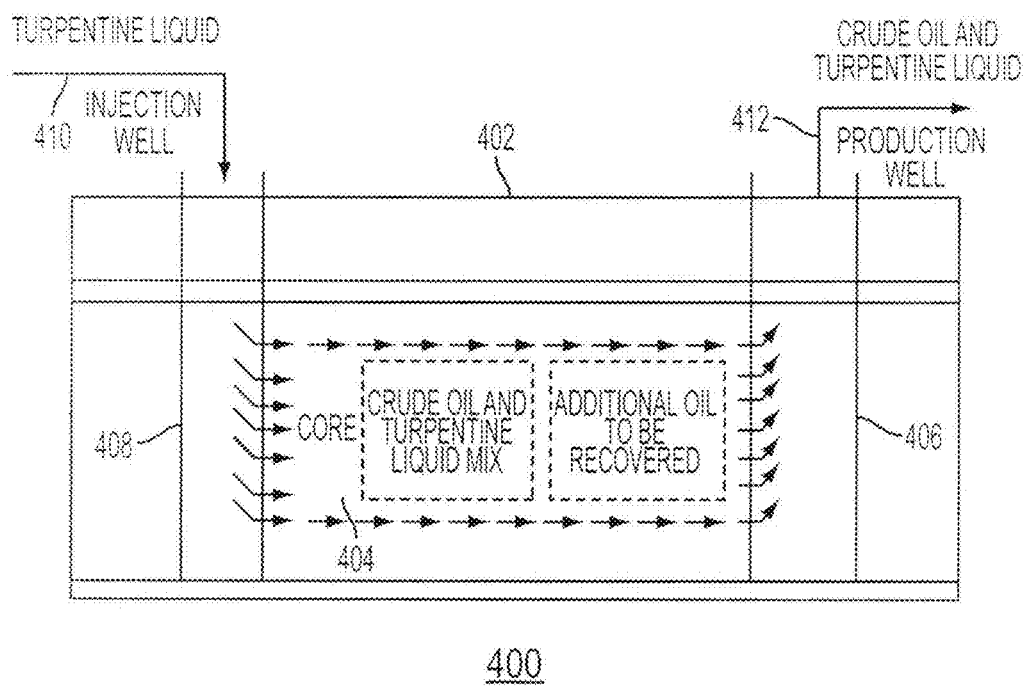
FIG. 4 is a schematic for the enhanced recovery of hydrocarbons from a subsurface reservoir.

Referring now to FIG. 4, process 400 is provided for the enhanced recovery of hydrocarbon-containing organic matter from a hydrocarbon-containing subsurface formation. Hydrocarbon-containing reservoir 404 is shown positioned below the surface 402. Producer well 406 is already in operation. Injection well 408 is provided for the injection of a turpentine liquid via line 410. The turpentine liquid facilitates the liquefaction, solubilization and/or extraction of hydrocarbon-containing organic matter present in the reservoir, as well as providing the driving force to push the hydrocarbon-containing organic matter in the formation toward the producer well. A hydrocarbon product stream that includes injected turpentine liquid is collected via line 412. Turpentine liquids operable for the recovery of hydrocarbons from a hydrocarbon-containing subsurface formation utilizing apparatus 400 can include, but are not limited to, α-terpineol and β-terpineol.

In certain embodiments, the turpentine liquid for increasing production from an oil well is provided that includes at least about 30% by volume of natural turpentine, synthetic turpentine, mineral turpentine, pine oil, α-pinene, β-pinene, α-terpineol, β-terpineol, γ-terpineol, terpene resins, α-terpene, β-terpene, γ-terpene, or mixtures thereof. In other embodiments, the turpentine liquid includes at least about 30% by volume geraniol, 3-carene, dipentene (p-mentha-1,8-diene), nopol, pinane, 2-pinane hydroperoxide, terpin hydrate, 2-pinanol, dihydromycenol, isoborneol, p-menthan-8-ol, α-terpinyl acetate, citronellol, p-menthan-8-yl acetate, 7-hydroxydihydrocitronellal, menthol, or mixtures thereof. In yet other embodiments, the turpentine liquid includes at least about 30% by volume anethole, camphene; p-cymene, anisaldeyde, 3,7-dimethyl-1,6-octadiene, isobornyl acetate, ocimene, alloocimene, alloocimene alcohols, 2-methoxy-2,6-dimethyl-7,8-epoxyoctane, camphor, citral, 7-methoxydihydro-citronellal, 10-camphorsulphonic acid, cintronellal, menthone, or mixtures thereof.

In certain embodiments, the turpentine liquid includes at least about 40% by volume α-terpineol. In other embodiments, the turpentine liquid includes at least about 25% by volume β-terpineol. In yet other embodiments, the turpentine liquid includes at least about 40% by volume α-terpineol and at least about 25% by volume β-terpineol. In other embodiments, the turpentine liquid includes at least about 50% α-terpineol, and in certain embodiments also includes β-terpineol. In certain embodiments, the turpentine liquid includes at least about 20% by volume of β-terpineol. In certain embodiments, the turpentine liquid includes between about 50 and 70% by volume of α-terpineol and between about 10 and 40% by volume of β-terpineol.

In another aspect, a process for increasing production from a sub-surface hydrocarbon-containing reservoir undergoing enhanced recovery operations is provided that includes injecting a turpentine liquid into the reservoir through an injection well to stimulate production of the hydrocarbon-containing material. The turpentine liquid can include at least one compound selected from natural turpentine, synthetic turpentine, mineral turpentine, pine oil, α-pinene, β-pinene, α-terpineol, β-terpineol, γ-terpineol, terpene resins, α-terpene, β-terpene, γ-terpene, and mixtures thereof. In other embodiments, the turpentine liquid can include at least one compound selected from geraniol, 3-carene, dipentene (p-mentha-1,8-diene), nopol, pinane, 2-pinane hydroperoxide, terpin hydrate, 2-pinanol, dihydromycenol, isoborneol, p-menthan-8-ol, α-terpinyl acetate, citronellol, p-menthan-8-yl acetate, 7-hydroxydihydrocitronellal, menthol, and mixtures thereof. In yet other embodiments, the turpentine liquid can include at least one compound selected from anethole, camphene; p-cymene, anisaldeyde, 3,7-dimethyl-1,6-octadiene, isobornyl acetate, ocimene, alloocimene, alloocimene alcohols, 2-methoxy-2,6-dimethyl-7,8-epoxyoctane, camphor, citral, 7-methoxydihydro-citronellal, 10-camphorsulphonic acid, cintronellal, menthone, and mixtures thereof. A hydrocarbon-containing organic matter production stream that includes the turpentine liquid and recovered hydrocarbons is recovered from a producer well associated with the hydrocarbon-containing reservoir. The hydrocarbon-containing organic matter production stream can be separated into a recovered hydrocarbons stream and a turpentine liquid for recycle. In certain embodiments, the method can further include the step of injecting the turpentine liquid recycle stream into the injection well.

In another aspect, a method for recovering hydrocarbon-containing organic matter from hydrocarbon-containing coal rich sub-surface formation is provided. The method includes the steps of extracting the hydrocarbon-containing organic matter by a process consisting essentially of the steps of obtaining coal sample that includes a recoverable hydrocarbon-containing organic matter and grinding the coal to produce crushed coal. The crushed coal is filtered and fed to a contacting vessel that includes at least one inlet for supplying a hydrocarbon extracting liquid to the contacting vessel. The crushed coal is contacted with a substantially surfactant-free non-aqueous hydrocarbon-extracting liquid consisting essentially of a turpentine liquid selected from the group consisting of natural turpentine, synthetic turpentine, mineral turpentine, pine oil, α-pinene, β-pinene, α-terpineol, β-terpineol, γ-terpineol, terpene resins, α-terpene, β-terpene, γ-terpene, geraniol, 3-carene, dipentene (p-mentha-1,8-diene), nopol, pinane, 2-pinane hydroperoxide, terpin hydrate, 2-pinanol, dihydromycenol, isoborneol, p-menthan-8-ol, α-terpinyl acetate, citronellol, p-menthan-8-yl acetate, 7-hydroxydihydrocitronellal, menthol, anethole, camphene; p-cymene, anisaldeyde, 3,7-dimethyl-1,6-octadiene, isobornyl acetate, ocimene, alloocimene, alloocimene alcohols, 2-methoxy-2,6-dimethyl-7,8-epoxyoctane, camphor, citral, 7-methoxydihydro-citronellal, 10-camphorsulphonic acid, cintronellal, menthone, and mixtures thereof, such that an extraction mixture is formed and a residual material is formed. The extraction mixture includes at least a portion of the hydrocarbon-containing organic matter in the turpentine liquid, and the residual material includes at least a portion of non-soluble material from the coal that is not soluble in the turpentine liquids. The residual material is separated from the extraction mixture, and the hydrocarbon-containing material organic matter is separated from the turpentine liquid to produce a hydrocarbon product stream and a turpentine liquid stream, wherein the hydrocarbon product stream includes at least a portion of the hydrocarbon-containing organic matter from the coal. At least a portion of the turpentine liquid stream is recycled to the contacting step.

In another aspect, a method for increasing production from a hydrocarbon-containing sub-surface hydrocarbon formation undergoing enhanced recovery operations is provided. The method includes the steps of injecting a turpentine liquid into the formation through an injection well. In certain embodiments, the turpentine liquid includes at least about 40% by volume α-terpineol and at least about 10% by volume β-terpineol. The turpentine liquid solubilizes, extracts and/or displaces the hydrocarbon-containing materials from the formation, which are subsequently recovered from the formation with the turpentine liquid through a producer well. In certain embodiments, the method further includes separating the hydrocarbons from the turpentine liquid. In yet other embodiments, the method further includes recycling the turpentine liquid to the injection well. In certain embodiments, α-terpineol is present in an amount between about 40 and 70% by volume. In certain other embodiments, α-terpineol is present in an amount of at least about 70% by volume. In yet other embodiments, β-terpineol is present in an amount between about 10 and 40% by volume. In other embodiments, the turpentine liquid further includes up to about 10% by volume γ-terpineol. In other embodiments, the turpentine liquid can include up to about 25% by volume of an organic solvent selected from methanol, ethanol, propanol, toluene and xylenes. The method is useful for the recovery of hydrocarbon-containing organic matter during primary, secondary and tertiary recovery operations, including after secondary recovery operations that include waterflooding.

In another aspect, a turpentine liquid for the recovery of hydrocarbon-containing organic matter from tar sands is provided. In one embodiment, the turpentine liquid includes at least about 30% by volume α-terpineol and at least about 25% by volume β-terpineol. In another embodiment, the turpentine liquid includes between about 30 and 70% by volume α-terpineol, between about 25 and 55% by volume β-terpineol, up to about 10% by volume α-terpene, and up to about 10% by volume β-terpene.

In another aspect, a turpentine liquid for recovering hydrocarbon-containing organic matter from high grade coal sources, such as for example, anthracite or bituminous coal, is provided. In one embodiment, the turpentine liquid includes at least about 45% by volume α-terpineol and at least about 15% by volume β-terpineol. In another embodiment, the turpentine liquid includes between about 45 and 80% by volume α-terpineol, between about 15 and 45% by volume β-terpineol, up to about 10% by volume α-terpene, and up to about 10% by volume β-terpene.

In another aspect, a turpentine liquid for recovering hydrocarbon-containing organic matter from low grade coal sources is provided. In one embodiment, the turpentine liquid includes at least about 60% by volume α-terpineol and up to about 30% by volume β-terpineol. In another embodiment, the turpentine liquid includes between about 60 and 95% by volume α-terpineol, up to about 30% by volume β-terpineol, up to about 5% by volume α-terpene, and up to about 5% by volume β-terpene.

In another aspect, a turpentine liquid for recovering hydrocarbon-containing organic matter from oil shale is provided. As used herein, oil shale generally refers to any sedimentary rock that contains bituminous materials. In one embodiment, the turpentine liquid includes at least about 60% by volume α-terpineol and up to about 30% by volume β-terpineol. In another embodiment, the turpentine liquid includes between about 60 and 95% by volume α-terpineol, up to about 30% by volume β-terpineol, up to about 5% by volume α-terpene, and up to about 5% by volume β-terpene.

In another aspect, a turpentine liquid is provided for recovering hydrocarbon-containing organic matter from light and medium crude oil. In one embodiment, the turpentine liquid includes at least between about 40 and 70% by volume α-terpineol and at least between about 30 and 40% by volume β-terpineol. In yet another embodiment, the turpentine liquid includes between about 40 and 70% by volume α-terpineol, between about 30 and 40% by volume β-terpineol, up to about 10% by volume α-terpene, and up to about 10% by volume β-terpene.

In another aspect, a turpentine liquid is provided for recovering hydrocarbon-containing organic matter from heavy and extra heavy crude oil. In one embodiment, the turpentine liquid includes at least between about 50 and 70% by volume α-terpineol and at least between about 30 and 40% by volume β-terpineol. In another embodiment, the turpentine liquid includes between about 50 and 70% by volume α-terpineol, between about 30 and 40% by volume β-terpineol, up to about 10% by volume α-terpene, and up to about 10% by volume β-terpene.

In another aspect, a method for recovering hydrocarbon-containing organic matter from tar sands is provided. The method includes obtaining a tar sand sample, such as for example, by mining a formation rich in tar sands to provide a tar sands sample, wherein the tar sands sample includes a recoverable hydrocarbon-containing organic matter and residual inorganic or insoluble material. The tar sands sample is supplied to a contacting vessel, wherein the contacting vessel includes at least one inlet for supplying a hydrocarbon-extracting liquid that consists essentially of a turpentine liquid for recovery of hydrocarbons from the tar sands. The tar sands sample is contacted with a hydrocarbon-extracting liquid and agitated to extract the hydrocarbon-containing organic matter from the tar sands to produce a residual material and an extraction mixture. The extraction mixture includes the hydrocarbon-extracting liquid and recovered hydrocarbon-containing organic matter, and the residual material which includes at least a portion of the non soluble material. The extraction mixture is separated from the residual material, and is further separated into a hydrocarbon product stream and a hydrocarbon-extracting liquid stream, wherein the hydrocarbon-extracting liquid stream includes at least a portion of the hydrocarbon-containing organic matter extracted from the tar sands. In certain embodiments, the method further includes the step of recycling the turpentine liquid stream to the contracting vessel. In other embodiments, the extraction mixture can be separated by distillation to produce the hydrocarbon product stream and the turpentine liquid recycle stream.

In certain embodiments, the turpentine liquid can include α-terpineol. In other embodiments, the turpentine liquid can include at least about 40% by volume α-terpineol and between about 10 and 40% by volume β-terpineol. In certain embodiments, between about 0.5 and 4 equivalents of the turpentine liquid is used to contact the tar sands and recover hydrocarbons. In certain embodiments, between about 0.5 and 2.0 equivalents of the turpentine liquid is used to contact the tar sands and recover hydrocarbons.

In another aspect, a method for recovering hydrocarbon-containing organic matter from a hydrocarbon rich oil shale is provided. The method includes mining a rock formation that includes hydrocarbon-containing organic matter to produce a hydrocarbon containing oil shale that includes a recoverable hydrocarbon material and inorganic or insoluble material. The oil shale is ground to produce comminuted hydrocarbon-containing oil shale. The comminuted hydrocarbon-containing oil shale is then filtered with a filter screen to prevent or control the excessively large particles from being supplied to the extraction process. The comminuted hydrocarbon-containing oil shale is fed to a contacting vessel, wherein the contacting vessel includes at least one inlet for supplying a hydrocarbon-extracting liquid consisting essentially of a turpentine liquid for recovery of hydrocarbons from the crushed hydrocarbon-containing oil shale. The comminuted hydrocarbon-containing oil shale is contacted with the hydrocarbon-extracting liquid such that an extraction mixture is formed and a residual material is formed, wherein the extraction mixture includes at least a portion of the hydrocarbon-containing organic matter in the hydrocarbon-extracting solvent and the residual material includes at least a portion of the non-soluble material from the oil shale. The extraction mixture is separated from the residual material. The hydrocarbon-containing organic matter from the hydrocarbon-extracting liquid in the extraction mixture are separated from the turpentine liquid to produce a hydrocarbon product stream that includes at least a portion of the hydrocarbon-containing organic matter and a hydrocarbon-extracting liquid stream. In certain embodiments, the turpentine liquid stream is recycled to the contacting vessel. In other embodiments, the comminuted hydrocarbon-containing oil shale has a mean particle size of less than about 0.4 mm in diameter. In other embodiments of the method for the recovery of hydrocarbon-containing organic matter from oil shale, the turpentine liquid includes at least one compound selected from natural turpentine, synthetic turpentine, mineral turpentine, pine oil, α-pinene, β-pinene, α-terpineol, β-terpineol, γ-terpineol, terpene resins, α-terpene, β-terpene, γ-terpene, or mixtures thereof. In other embodiments, the turpentine liquid includes at least one compound selected from geraniol, 3-carene, dipentene (p-mentha-1,8-diene), nopol, pinane, 2-pinane hydroperoxide, terpin hydrate, 2-pinanol, dihydromycenol, isoborneol, p-menthan-8-ol, α-terpinyl acetate, citronellol, p-menthan-8-yl acetate, 7-hydroxydihydrocitronellal, menthol, and mixtures thereof. In other embodiments, the turpentine liquid includes at least one compound selected from anethole, camphene; p-cymene, anisaldeyde, 3,7-dimethyl-1,6-octadiene, isobornyl acetate, ocimene, alloocimene, alloocimene alcohols, 2-methoxy-2,6-dimethyl-7,8-epoxyoctane, camphor, citral, 7-methoxydihydro-citronellal, 10-camphorsulphonic acid, cintronellal, menthone, and mixtures thereof. In certain embodiments, the turpentine liquid can include α-terpineol. In other embodiments, the turpentine liquid can include at least about 40% by volume α-terpineol and between about 10 and 40% by volume β-terpineol. In certain embodiments, between 0.5 and 4 equivalents of the turpentine liquid is used to contact the oil shale and recover hydrocarbon-containing organic matter. In certain embodiments, between 0.5 and 2.0 equivalents of the turpentine liquid is used to contact the oil shale and recover hydrocarbons.

In another aspect, a method for recovering hydrocarbon-containing organic matter from a coal rich sub-surface formation is provided. The method includes obtaining a coal, such as for example, by mining the sub-surface formation to produce coal, wherein the coal includes a recoverable hydrocarbon-containing organic matter and inorganic or insoluble material. The coal is ground to produce crushed coal and filtered to provide a sample of uniform or desired size. The crushed coal is fed to a contacting vessel, wherein the contacting vessel includes at least one inlet for supplying a hydrocarbon-extracting liquid consisting essentially of a turpentine liquid for recovery of hydrocarbons from crushed coal, and contacted with the hydrocarbon-extracting liquid such that an extraction mixture is formed and a residual material is formed, wherein the extraction mixture includes at least a portion of the hydrocarbon-containing organic matter in the hydrocarbon-extracting liquid. The residual mixture includes at least a portion of non-soluble material from the coal. The residual matter is separated from the extraction mixture. Hydrocarbon containing organic matter is separated from the hydrocarbon-containing liquid to produce a hydrocarbon product stream that includes at least a portion of the hydrocarbon containing organic matter from the coal and a hydrocarbon-extracting liquid stream. In certain embodiments, the method further includes recycling the hydrocarbon-extracting liquid stream to the contacting vessel. In yet other embodiments, the liquid coal product stream is supplied to a liquid coal refinery. In certain embodiments, the coal sample includes a low grade coal having a mean particle size of less than about 0.4 mm. In certain embodiments, the coal sample includes a high grade coal having a mean particle size of less than about 1 mm.

In yet other embodiments of the method for recovering hydrocarbon-containing organic matter from coal, the turpentine liquid includes at least one compound selected from natural turpentine, synthetic turpentine, mineral turpentine, pine oil, α-pinene, β-pinene, α-terpineol, β-terpineol, γ-terpineol, terpene resins, α-terpene, β-terpene, γ-terpene, or mixtures thereof. In other embodiments, the turpentine liquid includes at least one compound selected from geraniol, 3-carene, dipentene (p-mentha-1,8-diene), nopol, pinane, 2-pinane hydroperoxide, terpin hydrate, 2-pinanol, dihydromycenol, isoborneol, p-menthan-8-ol, α-terpinyl acetate, citronellol, p-menthan-8-yl acetate, 7-hydroxydihydrocitronellal, menthol, and mixtures thereof. In other embodiments, the turpentine liquid includes at least one compound selected from anethole, camphene; p-cymene, anisaldeyde, 3,7-dimethyl-1,6-octadiene, isobornyl acetate, ocimene, alloocimene, alloocimene alcohols, 2-methoxy-2,6-dimethyl-7,8-epoxyoctane, camphor, citral, 7-methoxydihydro-citronellal, 10-camphorsulphonic acid, cintronellal, menthone, and mixtures thereof. In certain embodiments, the turpentine liquid includes at least 60 about by volume α-terpineol. In certain embodiments, the turpentine liquid includes at least about 45% by volume α-terpineol and at least about 15% by volume β-terpineol. In certain other embodiments, the turpentine liquid includes at least about 60% by volume α-terpineol and up to about 30% by volume β-terpineol. In certain embodiments, between about 0.5 and 4 equivalents of the turpentine liquid is used to contact the coal and recover hydrocarbon-containing organic matter. In certain embodiments, between 0.5 and 2.0 equivalents of the turpentine liquid is used to contact the oil shale and recover hydrocarbon-containing organic matter.

In another aspect, a method for increasing recovery of hydrocarbon-containing organic matter from a production well is provided, wherein the production well is coupled to a hydrocarbon-containing sub-surface formation that includes hydrocarbon-containing material. The method includes the steps of extracting the hydrocarbon-containing organic matter by a process that includes the steps of providing an injection well that is in fluid communication with the sub-surface formation. A substantially surfactant-free first liquid is provided that includes a non-aqueous hydrocarbon-extracting liquid consisting essentially of a turpentine liquid that includes terpineol. The hydrocarbon-extracting liquid is injected through the injection well and into the formation, wherein the hydrocarbon-extracting liquid and the hydrocarbon-containing organic matter from the hydrocarbon containing sub-surface formation form an extraction mixture that includes at least a portion of the extraction mixture hydrocarbon-containing organic matter in at least a portion of the turpentine liquid. The extraction mixture is recovered from the formation through the production well, and the extraction mixture to produce a hydrocarbon product stream and a turpentine liquid stream.

In another aspect, a system for recovering hydrocarbon-containing organic material from tar sands is provided. The tar sands recovery system includes a tank for supplying a turpentine liquid and a contacting vessel, wherein the contacting vessel includes at least one inlet for introducing the turpentine liquid and at least one outlet for recovering an extraction mixture from the contacting vessel. The system also includes a first conveyor for supplying tar sands to the contacting vessel. A holding tank that includes a line connecting the holding tank to the contacting vessel is provided, wherein the line connecting the contacting vessel and the holding tank includes a filter to prevent the passage of solids to the holding tank. The system also includes a second conveyor for the recovery and transport of the solids.

In one embodiment, the contacting vessel is a rotary inclined filter that includes a series of fins or trays for separating and or controlling the tar sands. In another embodiment, the fins or trays are provided to increase or control the contact time between the tar sands and the turpentine liquid. In certain embodiments, the turpentine liquid can include α-terpineol. In other embodiments, the turpentine liquid can include between about 30% and about 70% by volume α-terpineol and between about 25% and about 55% by volume β-terpineol.

In another aspect, a system for recovering hydrocarbon-containing organic matter from oil shale is provided. The system includes a tank for supplying a turpentine liquid and a grinder for comminuting the oil shale to a reduced particle size. A contacting vessel is provided that includes at least one inlet for introducing the turpentine liquid, at least one inlet for receiving crushed oil shale, at least one outlet for recovering solids from the contacting vessel and at least one outlet for recovering an extraction mixture from the contacting vessel. A first conveyor is provided for supplying crushed oil shale to a contacting vessel. The system further includes a holding tank, wherein the holding tank includes a line connecting the holding tank to the contacting vessel, wherein the line includes a filter to prevent the passage of solids to the holding tank; a second conveyor for recovering solids. In certain embodiments, the system further includes a line for supplying a reaction mixture including recovered hydrocarbons and the turpentine liquid to a refinery for further separation and/or processing. In certain embodiments, the turpentine liquid can include α-terpineol. In certain embodiments, the turpentine liquid can include between about 60% and about 95% by volume α-terpineol and up to about 30% by volume β-terpineol. In other embodiments, the turpentine liquid can include between about 70% and about 90% by volume α-terpineol and between about 5% and about 25% by volume β-terpineol.

In another aspect, a system for recovering hydrocarbon-containing organic matter from coal is provided. The system includes a tank for supplying a turpentine liquid and a grinder for comminuting coal to produced particulate matter of a reduced size. Optionally, the system can include a filter to restrict the introduction of large particles. A contacting vessel is provided that includes at least one inlet for introducing the turpentine liquid and at least one outlet for recovering solids and liquids from the contacting vessel. The contacting vessel includes also stirring means for thoroughly mixing the turpentine liquid and the comminuted coal. A separator is provided for separating the solids and liquids, wherein the separator includes an inlet, an outlet and a line connecting the inlet of the separator to the outlet of the contacting vessel. The system also includes a holding tank, wherein the holding tank includes a line that connects the holding tank to the separator, wherein the line can include a filter to prevent the passage of solids to the holding tank.

In certain embodiments, the system further includes a filter for selectively preventing particles having a mean diameter greater than about 1 mm from being introduced to the contacting vessel. In certain other embodiments, the system further includes a line for supplying a liquid coal product to a refinery for further processing. In certain embodiments, the system further includes a first conveyor for supplying crushed coal to the contacting vessel. In other embodiments, the system further includes a second conveyor for removing solids from the separator. In certain embodiments, the turpentine liquid can include α-terpineol. In embodiments directed to the recovery of hydrocarbons from high grade coal, the turpentine liquid can include between about 45% and about 80% by volume α-terpineol and between about 15% and about 45% by volume β-terpineol. In embodiments directed to the recovery of hydrocarbons from low grade coal, the turpentine liquid can include between about 60% and about 95% by volume α-terpineol and between about 0% and about 30% by volume β-terpineol.

In certain embodiments, the hydrocarbon-extracting liquid can be separated from hydrocarbon-containing organic matter at, adjacent to, or in close proximity to the site of extraction of the hydrocarbon-containing material, i.e. coal, oil shale, tar sands, crude oil, heavy crude oil, natural gas and petroleum gas, crude bitumen, kerogen, natural asphalt and/or asphaltene.

In further embodiments, the hydrocarbon-extracting liquid can be partially separated from hydrocarbon-containing organic matter at, adjacent to, or in close proximity to the site of extraction. In such embodiments, a portion of the hydrocarbon-extracting liquid is allowed to remain in the hydrocarbon-containing organic matter, thereby reducing viscosity and preventing corrosion during storage and transport.

In other embodiments, separation of the hydrocarbon-extracting liquid from hydrocarbon-containing organic matter occurs at a downstream facility which may be distant from the site of extraction, e.g. at a refinery.

In another aspect, partial or full separation of hydrocarbon-extracting liquids can apply to other methods of hydrocarbon recovery to obtain the advantages provided by the present invention.

In another aspect, a method for optimizing a turpentine liquid for extraction of hydrocarbon-containing organic matter from hydrocarbon containing matter is provided. Generally, the method includes providing a sample of the hydrocarbon-containing material and analyzing the hydrocarbon material to determine the type of hydrocarbon being extracted. A formulation for extraction of hydrocarbon-containing organic matter from the hydrocarbon material is provided, wherein the formulation is a function of the type of formation, general operating conditions, and the size of the particulate hydrocarbon material. Generally, the formulation includes at least about 40% by volume α-terpineol and at least about 10% by volume β-terpineol. The amount of α-terpineol and β-terpineol in the formulation is then adjusted based upon the parameters noted above. In general, while the above noted method provides a good starting point for determining the desired formulation for extraction of various hydrocarbon containing materials, for other hydrocarbon-containing materials and under specified operating conditions, either a series of statistically designed experiments or a series of experiments according to an optimization method can be performed to determine the optimum composition of the liquid turpentine.

As shown in Table 1, the specific formulation for extraction, liquefaction and/or solubilization of hydrocarbon-containing organic matter from tar sands varies based upon the particle size. In certain embodiments, the method for preparing a turpentine liquid for extracting hydrocarbon-containing organic matter from tar sands includes adjusting the amount of α-terpineol and β-terpineol in the formulation as a function of the size of the hydrocarbon rich solid particulate being extracted. In other embodiments, if the hydrocarbon-containing organic particulate matter includes low grade coal or an oil shale, the amount α-terpineol in the turpentine liquid is increased and the amount of β-terpineol in the turpentine liquid is decreased. In other embodiments, if the hydrocarbon-containing organic particulate matter includes tar sands, the amount α-terpineol in the turpentine liquid is decreased and the amount of β-terpineol in the turpentine liquid is increased. In other embodiments, if the hydrocarbon-containing organic particulate matter includes tar sands and the mean diameter of the particulate matter is less than about 4.76 mm, then the amount α-terpineol in the turpentine liquid is decreased and the amount of β-terpineol in the turpentine liquid is increased. In other embodiments, if the hydrocarbon-containing organic particulate matter includes tar sands and the mean diameter of the particulate matter is greater than about 25 mm (1 mesh), then the amount α-terpineol in the turpentine liquid is decreased and the amount of β-terpineol in the turpentine liquid is increased.

TABLE 1

Formulations for Extraction of Tar Sands based upon Particle Size

| Particle Size (mm diameter) | α-terpineol | β-terpineol | α-/β-terpene | other |
|---|---|---|---|---|
| <5 mm | 30-50% vol | 35-55% vol | 10% vol | 5% vol |
| 5 mm-25 mm | 40-60% vol | 30-50% vol | 10% vol | 5% vol |
| >25 mm | 50-70% vol | 25-45% vol | 10% vol | 5% vol |

Similar to what is shown above with respect to the extraction of tar sands, as shown in Tables 2 and 3, the formulation for extraction, liquefaction and/or solubilization of coal depends on particle size, quality of the coal being extracted, and general operating conditions. In one embodiment of the method for preparing a turpentine liquid for extracting hydrocarbon-containing organic matter, if the hydrocarbon-containing matter includes anthracite, bituminous coal, or other high grade coal and the mean diameter of the particulate matter is less than about 0.1 mm, then the amount of α-terpineol in the turpentine liquid is decreased and the amount of β-terpineol in the turpentine liquid is increased. In other embodiments, if the hydrocarbon rich particulate matter includes anthracite, bituminous coal, or other high grade coal and the mean diameter of the particulate matter is greater than about 1 mm, then the amount of α-terpineol in the turpentine liquid is decreased and the amount of β-terpineol in the turpentine liquid is increased. In another embodiment, if the hydrocarbon rich particulate matter includes low grade coal and the mean diameter of the particulate matter is less than about 0.07 mm, then the amount of α-terpineol in the turpentine liquid is decreased and the amount of β-terpineol in the turpentine liquid is increased. In another embodiment, if the hydrocarbon rich particulate matter includes low grade coal and the mean diameter of the particulate matter is greater than about 0.4 mm, then the amount of α-terpineol in the turpentine liquid is decreased and the amount of β-terpineol in the turpentine liquid is increased.

TABLE 2

Formulations for Extraction of High Grade Coal based upon Particle Size

| Particle Size (mm diameter) | α-terpineol | β-terpineol | α-/β-terpene | other |
|---|---|---|---|---|
| <0.15 mm | 45-65% vol | 35-45% vol | 10% vol | 0% vol |
| 0.8 mm-0.15 mm | 50-70% vol | 20-40% vol | 10% vol | 0% vol |
| >0.8 mm | 60-80% vol | 15-35% vol | 10% vol | 0% vol |

TABLE 3

Formulations for Extraction of Low Grade Coal based upon Particle Size

| Particle Size (mm diameter) | α-terpineol | β-terpineol | α-/β-terpene | other |
|---|---|---|---|---|
| <0.07 mm | 60-80% vol | 10-30% vol | 5% vol | 0% vol |
| 0.07 mm-0.4 mm | 70-90% vol | 5-25% vol | 5% vol | 0% vol |
| >0.4 mm | 75-95% vol | 0-20% vol | 5% vol | 0% vol |

Similar to what is shown above with respect to the extraction of tar sands and coal, as shown in Table 4, the formulation for extraction, liquefaction and/or solubilization of oil shale depends on particle size. In one embodiment of the method for preparing a composition for extracting hydrocarbon-containing organic matter, if the hydrocarbon rich particulate matter includes an oil shale and the mean diameter of the particulate matter is less than about 0.074 mm, then the amount of α-terpineol in the turpentine liquid is decreased and the amount of β-terpineol in the turpentine liquid is increased. In another embodiment, if the hydrocarbon rich particulate matter includes oil shale and the mean diameter of the particulate matter is greater than about 0.42 mm, then the amount of α-terpineol in the turpentine liquid is decreased and the amount of β-terpineol in the turpentine liquid is increased.

TABLE 4

Formulations for Extraction of Oil Shale based upon Particle Size

| Particle Size (mm diameter) | α-terpineol | β-terpineol | α-/β-terpene | other |
|---|---|---|---|---|
| <0.07 mm | 60-80% vol | 10-30% vol | 5% vol | 0% vol |
| 0.07 mm-0.4 mm | 70-90% vol | 5-25% vol | 5% vol | 0% vol |
| >0.4 mm | 75-95% vol | 0-20% vol | 5% vol | 0% vol |

The formulation for the extraction of crude oil similarly depends on the type of crude oil being extracted, liquefied, and/or solubilized. As shown in Table 5, the formulation for the extraction, liquefaction and/or solubilization of crude oil is a function of both pore size and the quality of the density of the crude oil being extracted. The method includes providing a turpentine liquid formulation that includes at least about 50% by volume α-terpineol and at least about 20% by volume β-terpineol; adjusting the amount of α-terpineol and β-terpineol in the turpentine liquid formulation based upon the density of the liquid hydrocarbon being extracted. In one embodiment, if the API gravity of the liquid hydrocarbon being extracted is greater than about 22°, then the amount of α-terpineol in the turpentine liquid is decreased and the amount of β-terpineol in the turpentine liquid is increased. In another embodiment, if the API gravity of the liquid hydrocarbon being extracted is less than about 22, then the amount of α-terpineol in the turpentine liquid is increased and the amount of β-terpineol in the turpentine liquid is decreased. As used herein, light oils have an API of at least about 31°, medium crude oils have an API of between about 22° and about 31°, heavy oil has an API of between about 10° and about 22°, and extra heavy oil has an API of less than about 10°.

TABLE 5

Formulations for Extraction of Crude Oil based upon API Density

| Crude Type | α-terpineol | β-terpineol | α-/β-terpene | other |
|---|---|---|---|---|
| Light/medium crude (API greater than 22°) | 40-70% vol | 30-40% vol | 10% vol | 10% vol |
| Heavy/Extra Heavy (API less than 22°) | 50-70% vol | 20-35% vol | 10% vol | 5% vol |

In another aspect, a method for preparing a turpentine liquid for enhancing recovery of liquid hydrocarbon-containing organic matter from a sub-surface formation is provided. The method includes providing a formulation comprising at least about 50% by volume α-terpineol and at least about 20% by volume β-terpineol, and adjusting the amount of α-terpineol and β-terpineol in the formulation based upon the geological features of the sub-surface formation.

In another aspect, a composition for cleaning and/or recovering hydrocarbons from a liquid hydrocarbon-containing vessel is provided, wherein the composition includes at least one compound selected from natural turpentine, synthetic turpentine, mineral turpentine, pine oil, α-pinene, β-pinene, α-terpineol, β-terpineol, γ-terpineol, terpene resins, α-terpene, β-terpene, γ-terpene, or mixtures thereof. In other embodiments, the composition for cleaning and/or recovering hydrocarbons includes at least one compound selected from geraniol, 3-carene, dipentene (p-mentha-1,8-diene), nopol, pinane, 2-pinane hydroperoxide, terpin hydrate, 2-pinanol, dihydromycenol, isoborneol, p-menthan-8-ol, α-terpinyl acetate, citronellol, p-menthan-8-yl acetate, 7-hydroxydihydrocitronellal, menthol, and mixtures thereof. In yet other embodiments, the composition for cleaning and/or recovering hydrocarbons includes at least one compound selected from anethole, camphene; p-cymene, anisaldeyde, 3,7-dimethyl-1,6-octadiene, isobornyl acetate, ocimene, alloocimene, alloocimene alcohols, 2-methoxy-2,6-dimethyl-7,8-epoxyoctane, camphor, citral, 7-methoxydihydrocitronellal, 10-camphorsulphonic acid, cintronellal, menthone, and mixtures thereof. In one embodiment, the composition includes at least one compound from the following: α-pinene, β-pinene, α-terpineol, and β-terpineol. In another embodiment, the composition includes at least about 25% by volume α-terpineol or β-terpineol.

In another aspect, a method for cleaning and/or recovering hydrocarbons from a liquid hydrocarbon-containing vessel is provided. The method includes contacting the interior of vessel with a hydrocarbon cleaning composition that includes at least one compound selected from α-pinene, β-pinene, α-terpineol, and β-terpineol to create a mixture, wherein the mixture includes the liquid hydrocarbon residue and the hydrocarbon cleaning composition. The mixture is recovered and removed from the vessel. In certain embodiments, the cleaning composition includes at least about 25% by volume of α-terpineol or β-terpineol. In certain other embodiments, the cleaning composition includes at least about 25% by volume of α-terpineol and at least about 25% by volume β-terpineol.

In one embodiment, the present invention provides a method of extracting hydrocarbon-containing organic matter from a hydrocarbon-containing material, comprising extracting the hydrocarbon-containing organic matter by a process comprising, consisting essentially of, or consisting of providing a substantially surfactant-free first liquid comprising a non-aqueous hydrocarbon-extracting liquid consisting essentially of a turpentine liquid, contacting the hydrocarbon-containing material with the non-aqueous hydrocarbon extracting liquid such that an extraction mixture is formed, the extraction mixture comprising at least a portion of the hydrocarbon-containing organic matter extracted into the non-aqueous hydrocarbon extracting liquid, and separating the extraction mixture from any residual material containing non-soluble material from the hydrocarbon-containing material that is not soluble in the non-aqueous hydrocarbon extracting liquid.

In a further embodiment, the hydrocarbon-containing organic matter contacts the hydrocarbon-extracting liquid in situ in an underground formation containing hydrocarbon-containing organic matter, and means are provided for extracting hydrocarbon-containing organic matter from an underground formation.

In a further embodiment, the extraction mixture can be separated into a first portion and a second portion, the first portion of the extraction mixture comprising a hydrocarbon product comprising at least a portion of the hydrocarbon-containing organic matter, the second portion of the extraction mixture comprising at least a portion of the hydrocarbon-extracting liquid.

In one embodiment, the amount of organic matter extracted from the hydrocarbon-containing material is at least about 50%. In another embodiment, at least about 70% of organic matter is extracted from the hydrocarbon-containing material. In a further embodiment from about 75-100% of organic matter is extracted from the hydrocarbon-containing material.

In another embodiment, for example when the material is super heavy crude oil e.g. Venezuelan extra heavy crude, the methods of the present invention are operable to extract at least about 30-35% of the amount of organic matter from the hydrocarbon-containing material.

In a further embodiment, at least about 80% of hydrocarbons present in a hydrocarbon-containing material and extractable in the non-aqueous hydrocarbon extracting liquid can be extracted into the non-aqueous hydrocarbon extracting liquid within about 5 minutes of contacting. In other embodiments, at least about 80% of hydrocarbons present in a hydrocarbon-containing material and extractable in the non-aqueous hydrocarbon extracting liquid can be extracted into the non-aqueous hydrocarbon extracting liquid within about 3 minutes of contacting.

In one embodiment, the hydrocarbon-containing material is contacted with hydrocarbon-extracting liquid in a ratio of at least 2:1 of turpentine liquid to hydrocarbon-containing material.

In certain embodiments with extraction, e.g., from coal, the hydrocarbons being extracted are predominantly from the volatiles portion of the coal, as opposed to fixed carbon in the coal.

In one embodiment, the hydrocarbon-containing material can be a natural hydrocarbon-containing material from a naturally occurring geological formation. Some examples of natural hydrocarbon-containing materials are coal, crude oil, tar, tar sands, oil shale, oil sands, natural gas, petroleum gas, crude bitumen, natural kerogen, natural asphalt, and natural asphaltene.

In one embodiment of the method, the hydrocarbon-containing organic matter is extracted into the hydrocarbon-extracting liquid in an amount that corresponds to an amount of from about 1% to about 100% of the hydrocarbon-containing organic matter originally contained within the natural hydrocarbon-containing material. In certain embodiments, at least about 40 or 50%, in one embodiment at least about 60%, in another embodiment at least about 70%, in yet another embodiment at least about 80%, and in another embodiment at least about 90% of the hydrocarbon-containing organic matter originally contained within the natural hydrocarbon-containing material can be extracted into the hydrocarbon extracting liquid. Extraction of some or all of the hydrocarbon-containing organic matter from the natural hydrocarbon-containing material into the hydrocarbon-extracting liquid can take place from about 3 seconds to 180 minutes of contacting, between from about 97 seconds and 30 minutes, or between from about 15 and 30 minutes, in one embodiment within less than about 10 minutes, in another embodiment within less than about 5 minutes, in another embodiment within from 3 seconds to about 3 minutes at a contacting temperature in a range of from about 10 to 400° C., in one embodiment less than 100° C., in another embodiment in a range of from about 20-30° C. at a weight ratio of hydrocarbon-extracting liquid to the natural hydrocarbon-containing material of from about 10% to about 600%. In another embodiment the weight ratio of hydrocarbon-extracting liquid to the natural hydrocarbon-containing material is from about 1:1 to 2:1.

In one embodiment, hydrocarbon-containing organic matter from coal is extracted into the hydrocarbon-extracting liquid in an amount that corresponds to an amount of from about 60 to 100% of the hydrocarbon-containing organic matter originally contained within the coal sample and/or total carbon of at least from about 30% to 90% of hydrocarbon-containing organic matter originally contained within the coal sample within about 3 seconds to 3 minutes of contacting at a contacting temperature in a range of from about 80 to 100° C. at a weight ratio of hydrocarbon-extracting liquid to the coal of from about 1:1 to 2:1.

In another embodiment, hydrocarbon-containing organic matter from tar sands is extracted into the hydrocarbon-extracting liquid in an amount that corresponds to an amount of from about 85 to 100% of the hydrocarbon-containing organic matter originally contained within the tar sands sample within about 3 seconds to 3 minutes of contacting at a contacting temperature in a range of from about 30 to 60° C. at a weight ratio of hydrocarbon-extracting liquid to the tar sands of from about 1:1 to 2:1.

In another embodiment, hydrocarbon-containing organic matter from oil shale is extracted into the hydrocarbon-extracting liquid in an amount that corresponds to an amount of from about 50 to 100% of hydrocarbon-containing organic matter originally contained within the oil shale sample within about 3 seconds to 3 minutes of contacting at a contacting temperature in a range of from about 100 to 130° C. at a weight ratio of hydrocarbon-extracting liquid to the oil shale of from about 1:1 to 2:1.

In another embodiment, crude oil in an underground formation is contacted with hydrocarbon-extracting liquid in situ in the underground formation. During contacting, hydrocarbon-containing organic matter from the crude oil extracted into the hydrocarbon-extracting liquid in an amount that corresponds to an amount of from about 80 to 100% of hydrocarbon-containing organic matter originally contained within the crude oil sample within about 3 seconds to 3 minutes of contacting at a ratio of from about 1:1 to 1:2 of the hydrocarbon-extracting liquid to total pore volume of the underground formation.

In another embodiment, hydrocarbon-containing organic matter from natural gas is extracted into the hydrocarbon-extracting liquid in an amount that corresponds to an amount of from about 50 to 100% of hydrocarbon-containing organic matter originally contained within the natural gas sample within from about 3 seconds to 60 minutes of contacting at a contacting temperature in a range of from about 10 to 300° C. at a weight ratio of hydrocarbon-extracting liquid to said hydrocarbon-containing material of from about 0.1 to 600%.

In another embodiment, the present invention provides a method for modifying sulfur compounds in a sulfur-containing hydrocarbon-containing material from a natural geological formation by contacting or mixing the hydrocarbon-containing material with the hydrocarbon-extracting liquid such that the interaction of the turpentine liquid with sulfur in the hydrocarbon-containing material is operable to modify the hydrocarbon-containing material e.g. by inhibiting the corrosive and toxic effects of a reactive sulfur species. Further, this embodiment of the invention can be applied to sweetening a gas. Sweetening is accomplished through use of a sweetening module of a gas processing plant and may include trays, packing, or the like.

Sulfur-containing hydrocarbon-containing materials can include, but are not limited to, natural gas, petroleum gas, crude oil, tar sands, oil shale, and coal. The sulfur may be present as elemental sulfur, hydrogen sulfide, sulfides, disulfides, mercaptans, thiophenes, benzothiophenes, and the like.

In a further embodiment, sulfur-containing hydrocarbon containing materials in a gaseous form, such as natural gas or petroleum gas, can be bubbled through the hydrocarbon-extracting liquid to sweeten the gas.

In one embodiment, the present invention provides a method of reducing the corrosion of a corrodible surface. During transportation, drilling, downhole operations, exploration, hydrocarbon production, storage, handling, or production of hydrocarbon-containing material, for example by pipelines, tankers, casings, fishing tools, or drill bits, the metal surfaces that contact sulfur-containing compounds in the hydrocarbon containing materials may corrode. The present invention provides a method for significantly reducing corrosion by the addition of a corrosion-reducing liquid to a hydrocarbon-containing material. Uniform and pitting corrosion can be inhibited by the methods of the present invention. When a hydrocarbon-containing material is mixed with the corrosivity-reducing liquid thereby forming a mixture, the corrosion rate of the corrodible surfaces contacted with the mixture is substantially reduced as compared to corrosion of these surfaces when contacted with hydrocarbon-containing material in the absence of the corrosion-reducing liquid. In one embodiment, the corrosivity-reducing liquid does not produce a stable sulfonated component. In another embodiment, sulfur does not accumulate in the turpentine extraction liquid.

In some embodiments, the mixture comprises at least from about 0.0001 to 0.002% by volume of the corrosivity-reducing liquid. In another embodiment, the mixture comprises at least from about 0.0005% by volume of the corrosivity-reducing liquid. In a further embodiment, the mixture comprises at least from about 0.001% by volume of the corrosivity-reducing liquid. In a further embodiment, the mixture comprises at least from about 0.0015% by volume of the corrosivity-reducing liquid. In a further embodiment, the mixture comprises at least from about 0.001% to 0.002% by volume of the corrosivity-reducing liquid. In another embodiment, the mixture comprises at least from about 0.01% to 10% by volume of the corrosivity-reducing liquid. In a further embodiment, the mixture comprises at least from about 0.1% to 5% by volume of the corrosivity-reducing liquid. In yet another embodiment, the mixture comprises at least from about 0.5% to 2% by volume of the corrosivity-reducing liquid. In a further embodiment, the mixture comprises at least from about 1% by volume of the corrosivity-reducing liquid.

In a further embodiment, the rate of corrosion is reduced by at least about 2-fold as compared to corrosion of the surface when contacted with a hydrocarbon-containing material in an absence of the corrosivity-reducing liquid.

In another embodiment the rate of corrosion is reduced by at least about 3-fold. In a further embodiment, the rate of corrosion is reduced by at least about 4-fold as compared to corrosion of the surface when contacted with a hydrocarbon-containing material in an absence of the corrosivity-reducing liquid.

In one embodiment, the corrosivity-reducing liquid includes α-terpineol, β-terpineol, β-pinene, and p-cymene. In another embodiment the corrosivity-reducing liquid includes about 40% to about 60% α-terpineol, about 30% to about 40% β-terpineol, about 5% to about 20% β-pinene, and about 0 to about 10% p-cymene. In a further embodiment, the corrosivity-reducing liquid comprises a blend of turpentine liquids.

In certain embodiments, the hydrocarbon-containing material treated with corrosivity-reducing liquid is crude oil, heavy crude oil, tar sands, oil sands, oil shale, natural gas, petroleum gas, or a combination thereof.

In another embodiment, the present invention provides a method of preparing a hydrocarbon-containing gas by contacting a hydrocarbon-containing material with a substantially surfactant-free first liquid that includes a non-aqueous hydrocarbon-extracting liquid, wherein the non-aqueous hydrocarbon-extracting liquid includes a turpentine liquid, forming a mixture, wherein the mixture comprises at least a portion of the hydrocarbon-containing organic matter extracted into the hydrocarbon-extracting liquid, and heating the mixture to form a gas containing the hydrocarbon-extracting material and hydrocarbons extracted from the hydrocarbon-containing material.

In certain embodiments, the hydrocarbon-containing material is crude oil, heavy crude oil, tar sands, oil sands, oil shale, natural gas, petroleum gas, or a combination thereof.

The present invention provides a method for increasing recovery of hydrocarbon-containing organic matter from a production well coupled to a hydrocarbon-containing sub-surface formation containing hydrocarbon-containing material. The method includes: providing an injection well in fluid communication with the sub-surface formation, injecting a substantially surfactant-free first liquid comprising a non-aqueous hydrocarbon-extracting liquid consisting essentially of a turpentine liquid, e.g. terpineol, into the formation to form an extraction mixture comprising at least a portion of the extraction mixture hydrocarbon-containing organic matter in at least a portion of the turpentine liquid, recovering the extraction mixture from the formation through the production well, and separating the extraction mixture to produce a hydrocarbon product stream and a turpentine liquid stream. The hydrocarbon-extracting liquid can be recycled for reinjection.

The present invention provides a method for recovering hydrocarbon-containing organic matter from tar sands. The method involves obtaining tar sands comprising recoverable hydrocarbon-containing organic matter, providing a substantially surfactant-free first liquid comprising a hydrocarbon-extracting liquid comprising a turpentine liquid comprising at least one of α-terpineol or β-terpineol, supplying the tar sands sample to a contacting vessel, contacting the tar sands sample with the hydrocarbon-extracting liquid in a contacting vessel and agitating the tar sands sample with the hydrocarbon-extracting liquid such that an extraction mixture is formed and a residual material is formed, separating the extraction mixture from the residual material, separating the extraction mixture into a hydrocarbon product stream and a hydrocarbon-extracting liquid stream, and recycling at least a portion of the hydrocarbon-extracting liquid stream to the contacting step. The extraction mixture includes at least a portion of the hydrocarbon-containing organic matter in the hydrocarbon-extracting liquid and the residual material includes at least a portion of non-soluble material from the tar sands that is not soluble in the hydrocarbon-extracting liquid and the hydrocarbon product stream includes at least a portion of the hydrocarbon-containing organic matter from the tar sands.

The present invention provides a method for recovering hydrocarbon-containing organic matter from comminuted hydrocarbon-containing oil shale. The method involves contacting the comminuted hydrocarbon-containing oil shale with a substantially surfactant-free first liquid comprising a non-aqueous hydrocarbon-extracting liquid consisting essentially of a turpentine liquid selected from the group consisting of natural turpentine, synthetic turpentine, mineral turpentine, pine oil, α-pinene, β-pinene, α-terpineol, β-terpineol, γ-terpineol, terpene resins, α-terpene, β-terpene, γ-terpene, geraniol, 3-carene, dipentene (p-mentha-1,8-diene), nopol, pinane, 2-pinane hydroperoxide, terpin hydrate, 2-pinanol, dihydromycenol, isoborneol, p-menthan-8-ol, α-terpinyl acetate, citronellol, p-menthan-8-yl acetate, 7-hydroxydihydrocitronellal, menthol, anethole, camphene; p-cymene, anisaldeyde, 3,7-dimethyl-1,6-octadiene, isobornyl acetate, ocimene, alloocimene, alloocimene alcohols, 2-methoxy-2,6-dimethyl-7,8-epoxyoctane, camphor, citral, 7-methoxydihydro-citronellal, 10-camphorsulphonic acid, cintronellal, menthone, and mixtures thereof, filtering the comminuted hydrocarbon-containing oil shale, feeding the crushed hydrocarbon-containing oil shale to a contacting vessel, contacting the comminuted hydrocarbon-containing oil shale with the hydrocarbon-extracting liquid such that an extraction mixture is formed and a residual material is formed, separating the extraction mixture from the residual material, separating the hydrocarbon-containing organic matter from the hydrocarbon-extracting liquid in the extraction mixture to produce a hydrocarbon product stream and a hydrocarbon-extracting liquid stream, the hydrocarbon product stream comprising at least a portion of the hydrocarbon-containing organic matter from the comminuted hydrocarbon containing oil shale, and recycling at least a portion of the hydrocarbon-extracting liquid stream to the contacting step. The extraction mixture comprising at least a portion of the hydrocarbon-containing organic matter in the hydrocarbon-extracting liquid, the residual material comprising at least a portion of non-soluble material from the oil shale that is not soluble in the hydrocarbon-extracting liquid.

The present invention provides a method for recovering hydrocarbon-containing organic matter from hydrocarbon-containing coal rich sub-surface formation. The method involves obtaining and grinding coal comprising a recoverable hydrocarbon-containing organic matter to produce crushed coal, filtering the crushed coal, feeding the crushed coal to a contacting vessel, said contacting vessel which has at least one inlet for supplying a hydrocarbon-extracting liquid to the contacting vessel, contacting the crushed coal with a substantially surfactant-free non-aqueous hydrocarbon-extracting liquid consisting essentially of a turpentine liquid selected from the group consisting of natural turpentine, synthetic turpentine, mineral turpentine, pine oil, α-pinene, β-pinene, α-terpineol, β-terpineol, γ-terpineol, terpene resins, α-terpene, β-terpene, γ-terpene, geraniol, 3-carene, dipentene (p-mentha-1,8-diene), nopol, pinane, 2-pinane hydroperoxide, terpin hydrate, 2-pinanol, dihydromycenol, isoborneol, p-menthan-8-ol, α-terpinyl acetate, citronellol, p-menthan-8-yl acetate, 7-hydroxydihydrocitronellal, menthol, anethole, camphene; p-cymene, anisaldeyde, 3,7-dimethyl-1,6-octadiene, isobornyl acetate, ocimene, alloocimene, alloocimene alcohols, 2-methoxy-2,6-dimethyl-7,8-epoxyoctane, camphor, citral, 7-methoxydihydro-citronellal, 10-camphorsulphonic acid, cintronellal, menthone, and mixtures thereof such that an extraction mixture is formed and a residual material is formed, the extraction mixture comprising at least a portion of the hydrocarbon-containing organic matter in the hydrocarbon-extracting liquid, the residual material comprising at least a portion of non-soluble material from the coal that is not soluble in the hydrocarbon-extracting liquid, separating the residual material from the extraction mixture, separating the hydrocarbon-containing organic matter from the hydrocarbon-extracting liquid to produce a hydrocarbon product stream and a hydrocarbon-extracting liquid stream, the hydrocarbon product stream comprising at least a portion of the hydrocarbon-containing organic matter from the coal, and recycling at least a portion of the hydrocarbon-extracting liquid stream to the contacting step, wherein said first liquid contains no water or essentially no water.

EXAMPLES

Example 1

In this example, coal from the Pittsburgh seam in Washington County, Pennsylvania was liquefied with reagent α-terpineol. The coal sample was obtained from the Coal Bank at Pennsylvania State University, which provided the following proximate analyses for it; 2.00 wt. % of as-received moisture, 9.25 wt. % of dry ash, 38.63 wt. % of dry volatile matter, and 50.12 wt. % of dry fixed carbon. The particle size of coal sample was about 60 mesh. About 60 grams of α-terpineol was gently added to about 30 grams of the coal sample placed in an extraction vessel, thus giving rise to the reagent-to-sample ratio of 2 to 1. The capped, but not tightly sealed, extraction vessel containing the resultant mixture of α-terpineol and coal was maintained at the constant temperature of about 96° C. and continually agitated. Without boiling the α-terpineol, the pressure in the extraction vessel remained at the ambient pressure of slightly less than about $1.01 \times 10^5$ Pascals (1 atm). After about 30 minutes, the mixture was filtered and the coal particles retained on the filter were washed with ethanol and dried to a constant weight. On the basis of weight loss, the conversion, i.e., the extent of liquefaction, of the coal sample was determined to be about 68 wt. %.

Example 2

This example is identical to Example 1 in all aspects except two. After maintaining the temperature at about 96° C., for about 30 minutes, as done in Example 1, the extraction vessel containing the coal sample and α-terpineol was maintained at a temperature at about 135° C. for an additional period of about 30 minutes. The pressure in the extraction vessel remained at the ambient pressure of slightly less than about $1.01 \times 10^5$ Pascals (1 atm). The conversion, i.e., the degree of liquefaction, of the coal sample was determined to be about 70 wt. %.

Example 3

The coal sample used was from the same source with the same proximate analyses as those used in the preceding two examples. About 31 grams of α-terpineol were added to about 31 grams of the coal sample in an extraction vessel. The mixture was maintained at about 96° C. and an ambient pressure of slightly less than about $1.01 \times 10^5$ Pascals (1 atm) for about 30 minutes. The conversion, i.e., the degree of liquefaction, of the coal sample attained was determined to be about 71 wt. % by weighing the sample after filtering, washing, and drying as done in the preceding two examples.

Example 4

This example is identical to Example 3, except that about 30 wt. % of α-terpineol was replaced with hexane, providing a reagent that includes 70 wt. % α-terpineol and 30 wt. % hexane. This reduced the conversion, i.e., the degree of liquefaction to about 1.3 wt. %.

Example 5

The source and proximate analyses of coal sample and experimental conditions in terms of temperature, pressure and reagent-to-sample ratio for this example were the same as those of Example 3. The duration of the extraction, however, was reduced from about 30 minutes to about 20 minutes. Additionally, about 30 wt. % of the α-terpineol was replaced with 1-butanol, providing a reagent that includes 70 wt. % α-terpineol and 30 wt. % 1-butanol. The amount of coal liquefied was only about 0.30 gram, corresponding to conversion of about 1.0 wt. %.

Example 6

This example is the same as Example 3 in terms of the source and proximate analyses of coal sample and temperature, pressure and duration of the extraction. The amount of the coal sample used was, however, about 25 grams and the reagent comprised about 24 grams (80 wt. %) of α-terpineol and about 6 grams (20 wt. %) of xylenes, providing a reagent that includes 70 wt. % α-terpineol and 30 wt. % xylenes. The coal liquefied was about 10.0 grams, corresponding to conversion of about 40 wt. %.

Example 7

In this example, coal from the Wyodak seam in Campbell County, Wyoming was liquefied with reagent α-terpineol. The coal sample was obtained from the Coal Bank at Pennsylvania State University, which provided the following proximate analyses for it; 26.30 wt. % of as-received moisture, 7.57 wt. % of dry ash, 44.86 wt. % of dry volatile matter, and 47.57 wt. % of dry fixed carbon. The coal sample's particle size was about 20 mesh. About 60 grams of α-terpineol was gently added to about 30 grams of the coal sample placed in an extraction vessel, a reagent-to-sample ratio of about 2 to 1. The capped, but not tightly sealed, extraction vessel containing the resultant mixture of α-terpineol and coal was maintained at a constant temperature of about 96° C. and continually agitated. Without boiling of the α-terpineol, the pressure in the extraction vessel remained at the ambient pressure of slightly less than about $1.01 \times 10^5$ Pascals (1 atm). After about 30 minutes, the mixture in the extraction vessel was filtered and the coal particles retained on the filter were washed with ethanol and dried to a constant weight. On the basis of weight loss, the conversion, i.e., the degree of liquefaction, of the coal sample was determined to be 75 wt. %.

Example 8

The experiment in this example was carried out under the conditions identical to those of the preceding example except one. About 15 grams of α-terpineol were added, instead of about 60 grams, as done in the preceding example, to about 30 grams of the coal sample, thus attaining the reagent-to-coal ratio of 0.5 to 1. The conversion, i.e., the degree of liquefaction, of the coal sample attained decreased from about 75 wt. %, attained in the preceding example, to about 69 wt. %.

Example 9

In this example, about 3 grams of oil shale from the Greenriver region of Colorado was solubilized with about 9 grams of α-terpineol, thus giving rise to the reagent-to-sample ratio of 3 to 1, to extract kerogen (organic matter) and/or bitumen (organic matter) from it. The organic carbon content, including both volatile and fixed carbon, was determined to be about 22.66 wt. % by a certified analysis company. Two experiments with the oil-shale samples, having the particle size of 60 mesh, were carried out under the ambient temperature and pressure of about 25° C. and slightly less than about $1.01 \times 10^5$ Pascals (1 atm), respectively. The weight losses of the samples were determined by weighing after filtering, washing with ethanol, and drying. These losses were about 9 wt. % after about 30 minutes and about 17 wt. % after about 45 minutes. From these weight losses, the conversion, i.e., the degree of extraction of organic matter, i.e., kerogen and/or bitumen, was estimated to be about 40 wt. % for the former and was about 75 wt. % for the latter.

Example 10

This example duplicated the preceding example with the exception that a single experiment, lasting about 15 minutes, was carried out at the temperature of about 96° C., instead of about 25° C. The weight loss of the oil shale sample was about 12 wt. %, corresponding to the conversion, i.e., the degree of extraction, of kerogen (organic matter) of about 53 wt. %

Example 11

In this example, bitumen (organic matter) in tar sands from Alberta, Canada, was solubilized and extracted with commercial grade synthetic turpentine. The tar-sands sample was obtained from Alberta Research Council, which provided the following proximate analyses for it; 84.4 wt. % of dry solids, 11.6 wt. % of dry bitumen, and 4.0 wt. % of as-received moisture. About 30 grams of synthetic turpentine were gently added to about 15 grams of the tar-sands sample in a capped, but not tightly sealed, extraction vessel, utilizing a reagent-to-sample ratio of about 2 to 1 by weight. This extraction vessel, containing the resultant mixture of synthetic turpentine and tar sands, was maintained at a constant temperature of about 96° C. and continually agitated. Without boiling of the synthetic turpentine, the pressure in the extraction vessel remained at the ambient pressure of slightly less than about $1.01 \times 10^5$ Pascals (1 atm). After about 20 minutes, the mixture in the extraction vessel was filtered and the solids (tar sands) retained on the filter were washed with ethanol and dried to a constant weight. On the basis of weight loss, the conversion, i.e., the degree of extraction, of bitumen from the tar-sands sample was determined to be about 100 wt. %.

Example 12

In this example, about 60 grams of the tar-sands sample from the same source with the same proximate analyses as those of the preceding example were extracted by about 60 grams of α-terpineol, instead of commercial-grade synthetic turpentine, which includes α-terpineol. The resultant reagent-to-sample ratio was 1 to 1 instead of 2 to 1 as in the preceding example. The experiment lasted about 30 minutes at the temperature of about 96° C. under the ambient pressure of slightly less than about $1.01 \times 10^5$ Pascals (1 atm). The conversion, i.e., the extent of extraction, of bitumen (organic matter) in the tar-sands sample was determined to be about 100 wt. %.

Example 13

In this example, about 60 grams of the tar-sands sample from the same source with the same proximate analyses as those of the preceding two examples were extracted by about 60 grams of synthetic turpentine, which is of the commercial grade. The resultant reagent-to-sample ratio, therefore, was about 1 to 1. The experiment was carried out for about 30 minutes at the temperature of about 96° C. under the ambient pressure of slightly less than about $1.01 \times 10^5$ Pascals (1 atm). The conversion, i.e., the degree of extraction, of bitumen (organic matter) in the tar-sands sample was determined to be about 70 wt. %.

Example 14

The experiment in this example duplicated that in Example 8 in all aspects except that the reagent-to-sample ratio was reduced from about 2 to 1 to about 0.5 to 1: About 60 grams to the tar-sands sample was extracted by about 30 grams of synthetic turpentine, which is of the commercial grade. The conversion, i.e., the degree of extraction, of bitumen (organic matter) decreased from about 100 wt. % attained in Example 9 to about 70 wt. %.

Example 15

The experiment in this example repeated that of the preceding example with α-terpineol instead of the commercial-grade synthetic turpentine. The conversion, i.e., the degree of extraction, of bitumen (organic matter) in the tar-sands sample was about 70 wt. % as in the preceding example.

Example 16

The experiment in this example was carried out under the ambient pressure of slightly less than about $1.01 \times 10^5$ Pascals (1 atm) with the tar-sands sample from the same source with the same proximate analyses as those in the preceding examples with tar sands. About 60 grams of commercial-grade synthetic turpentine was added to about 60 grams of the tar-sands sample, thus giving rise to the reagent-to-sample ratio of about 1 to 1. The temperature of the sample and commercial-grade synthetic turpentine was maintained at about 65° C. for about 30 minutes followed by cooling to about 15° C. within about 5 minutes. Subsequently, the tar-sands sample was filtered, washed, dried and weighed. On the basis of weight loss, the conversion, i.e., the degree of extraction, of bitumen (organic matter) in the tar-sands sample was determined to be about 70 wt. %.

Example 17

The experiment in this example repeated that of the preceding example with α-terpineol instead of commercial grade synthetic turpentine. The conversion, i.e., the degree of extraction, of bitumen (organic matter) increased to about 90 wt. % from about 70 wt. % of the preceding examples.

Example 18

In this example, a tar-sands sample, weighing about 30 grams, from the same source with the same proximate analyses as those in Examples 11 through 17, was extracted with a liquid that included about 20 grams (80 wt. %) of α-terpineol and about 5 grams (20 wt. %) of toluene at the temperature of about 96° C. under the ambient pressure of slightly less than about $1.01 \times 10^5$ Pascals (1 atm). The duration of the experiment (reaction or extraction time) was about 30 minutes. The weigh loss of the sample was about 10.2 grams. From this weigh loss, the conversion, i.e., the degree of extraction, of bitumen (organic matter) was estimated to be about 33 wt. %.

Example 19

Three tar-sands samples, all from the same source with the same proximate analyses as those used in all preceding examples with tar sands were extracted by reagents comprising various amounts of α-terpineol and ethanol at the temperature of about 15° C. under the ambient pressure of slightly less than about $1.01 \times 10^5$ Pascals (1 atm). The duration of each experiment (reaction or extraction time) was about 15 minutes for each tar-sands sample. The first sample was extracted with a mixture comprising about 0 gram (0 wt. %) of α-terpineol and about 15 grams (100 wt. %) of ethanol, i.e., with pure ethanol. The second sample was extracted with a mixture comprising about 7.5 grams (50 wt. %) of α-terpineol and about 7.5 grams (50 wt. %) of ethanol. The third sample was extracted with a mixture comprising about 12 grams (80 wt. %) of α-terpineol and about 3 grams (20 wt. %) of ethanol. The weight losses and the estimated conversions, i.e., the degrees of extraction, of bitumen (organic matter) in the three samples were about 0.2 gram (1.0 wt. %), 0.6 gram (3.0 wt. %) and 0.9 gram (4.5 wt. %), for the first, second and third sample, respectively.

Example 20

Irregular-shaped pellets of commercial-grade asphalt whose average size was about 15 mm were solubilized and extracted with α-terpineol and at the ambient temperature of about 22° C. under the ambient pressure of slightly less than about $1.01 \times 10^5$ Pascals (1 atm). The first sample weighing about 20 grams was solubilized and extracted with about 40 grams of α-terpineol, and the second sample also weighing about 20 grams was solubilized and extracted with about 20 grams of α-terpineol. The hydrocarbons in both samples were completely extracted after 30 minutes. These experiments were carried out to simulate the solubilization and extraction of heavy crude oil, which tends to be rich in asphaltenes like asphalt.

Example 21

In this example, bitumen (organic matter) in tar-sands from the same source with the same proximate analyses as those used in all previous examples with tar sands was solubilized and extracted with two varieties of vegetable oils, soybean oil and corn oil. The vegetable oils are completely miscible with turpentine liquid. In the first experiment, a tar-sands sample weighing about 15 grams was blended and agitated continually with about 30 grams of soybean oil for about 20 minutes at the temperature of about 96° C. under the ambient pressure of slightly less than about $1.01 \times 10^5$ Pascals (1 atm). The weight loss was about 0.5 gram from which the conversion, i.e., the degree of extraction, of bitumen in the sample was estimated to be about 3.3 wt. %. In the second experiment, a tar-sands sample weighing about 30 grams was blended and agitated continually with about 60 grams of corn oil for about 30 minutes at the temperature of about 175° C. under the ambient pressure of slightly less than about $1.01 \times 10^5$ Pascals (1 atm). The weight loss was about 4.8 grams from which the conversion, i.e., the degree of extraction, of bitumen in the sample was estimated to be about 12 wt. %.

Example 22

Two tests were performed on Berea sandstone plug core samples to determine the effect of reagent injection on oil recovery from core. The first test was designed to determine the increment oil recovery due to α-terpineol injection after a field had already undergone waterflooding to the limit. The selected core contained 9.01 mL of laboratory oil simulating crude oil. The waterflooding with aqueous solution containing 3.0% of potassium chloride produced 4.6 mL of oil. Five (5) pore volumes of α-terpineol injection produced additional 3.61 mL of oil, thereby leaving the core with less than 8.0% of oil remaining in the original volume. The second test was designed to represent the increased recovery that could be expected from a virgin reservoir with α-terpineol injection. The selected core contained 8.85 mL of laboratory oil simulating crude oil. Oil production began after approximately 0.5 pore volumes of α-terpineol injection, and continued until 3.5 pore volumes of α-terpineol had been injected; however, the majority of the oil was recovered after only 2.5 pore volumes of α-terpineol injection. A total of 7.94 mL of laboratory oil was recovered, thereby leaving the core with less than 7.5% of oil remaining in the original volume.

In one experiment, various ratios of a turpentine liquid to tar sands sample were tested. The turpentine liquid for each of the experiments provided below had the same formulation, wherein the composition included about 60% by volume α-terpineol, about 20% by volume β-terpineol, and about 20% by volume γ-terpineol. The tar sands were a different mix of ores from Alberta, Canada, having a bitumen content of approximately 12% by weight and a water content of between about 4-5% by weight. The experiments were all performed at various temperatures as listed in Table 6.

As shown in Table 6 below, recovery of hydrocarbons from tar sands across all ratios provided below (i.e., ratios of turpentine liquid to tar sands ranging from about 1:2 to about 2:1) resulted in good recovery of hydrocarbons and little discernible difference. With respect to the temperature at which the extraction is carried out, it is believed that the optimum temperature for the extraction, solubilization and/or liquefaction of hydrocarbons from tar sands is about 65° C. As shown in the table, at about 130° C., the amount of hydrocarbons recovered from the tar sands is reduced. It is noted however, that for certain solids from which it is particularly difficult to recover hydrocarbons, increasing the temperature of the extraction solvent can increase the amount of hydrocarbons that are recovered. Finally, it is shown that exposure time had very little effect on the amount of materials that were extracted. This is likely because the shortest extraction time was about 20 minutes, which is believed to be more than adequate for the extraction of the hydrocarbons from tar sands.

TABLE 6

| Tar Sands Weight, g | Extractable HC weight, g | Weight of extraction solvent | Ratio of tar sands to solvent | Amount of HC extracted, g | Percent HC extracted | Temp, ° C. | Exposure Time, minutes |
|---|---|---|---|---|---|---|---|
| 15 | 2.0 | 30.0 | 1:2 | 3.2 | 161 | 96 | 20 |
| 60 | 7.8 | 120.0 | 1:2 | 5.4 | 69 | 96 | 30 |
| 60 | 7.8 | 31.6 | 2:1 | 9.6 | 123 | 96 | 30 |
| 60 | 7.8 | 60.0 | 1:1 | 7.6 | 97 | 65 | 30 |
| 60 | 7.8 | 60.0 | 1:1 | 4.0 | 51 | 130 | 30 |
| 60 | 7.8 | 60.0 | 1:1 | 6.3 | 80 | 65 | 30 |

Additional experiments were conducted using alternative solvents, namely ethanol and corn oil, which was compared with the composition that included about 60% by volume α-terpineol, about 20% by volume β-terpineol, and about 20% by volume γ-terpineol. As noted in Table 7 provided below, the performance of ethanol and corn oil were unexpectedly substantially lower than the composition that included about 60% by volume α-terpineol, about 20% by volume β-terpineol, and about 20% by volume γ-terpineol. For example, whereas the terpineol composition achieved complete or nearly complete extraction of extractable hydrocarbons, ethanol yielded only about 10% of the recoverable hydrocarbons and heated corn oil yielded only about 33% of the recoverable hydrocarbons.

pineol, about 30% by volume β-terpineol, and about 10% by volume γ-terpineol. The results unexpectedly show that as the concentration of the α-terpineol increases, performance of the turpentine liquid increases to the point that when the turpentine liquid includes approximately 70% α-terpineol, full extraction of the hydrocarbon material from the tar sands sample is achieved.

The second set of data is presented for extraction of hydrocarbon bearing tar sands with pure α-terpineol. As shown, extraction of greater than 100% is achieved, likely due to inconsistencies in the hydrocarbon content of the samples. However, the results generally demonstrate the unexpected result that α-terpineol is capable of extracting substantially all of the recoverable hydrocarbon from a tar sands sample.

The data provided in Table 8 illustrates the effectiveness of mixed systems of α-terpineol and known organic solvents. As shown, substantially complete recovery of recoverable hydrocarbons is achieved with a composition that includes

TABLE 7

| Chemical | Tar Sands Weight, g | Extractable HC weight, g | Weight of extraction solvent | Ratio of tar sands to solvent | Amount of HC extracted, g | Percent HC extracted | Temp, ° C. | Exposure Time, minutes |
|---|---|---|---|---|---|---|---|---|
| Ethanol | 15 | 2.0 | 15.0 | 1:1 | o.2 | 10 | 15 | 15 |
| Corn oil | 30 | 3.9 | 60.0 | 2:1 | 1.3 | 33 | 175 | 30 |
| 60/20/20 terpineol | 60 | 7.8 | 60.0 | 1:1 | 7.6 | 97 | 65 | 30 |
| 60/20/20 terpineol | 60 | 7.8 | 31.6 | 2:1 | 9.6 | 123 | 96 | 30 |

As shown in Table 8 below, the performance of various turpentine liquid formulations, including turpentine liquid formulations that include only α-terpineol and α-terpineol in combination with various known organic solvents, are provided. The first three compositions presented in the table include α-terpineol, β-terpineol, and γ-terpineol. For example, the first same includes about 60% by volume α-terabout a 1:1 ratio of α-terpineol to ethanol. This is unexpected as pure ethanol only removed about 10% of the total recoverable hydrocarbons. Additionally, mixed systems that include either a 1:1 or a 3:1 ratio of α-terpineol to toluene still resulted in the recovery of about 77% and 92% of the total recoverable hydrocarbons. This was an unexpected result.

TABLE 8

| Chemical comp. | Tar Sands wt., g | Extractable HC wt., g | Wt. of solvent | Ratio of tar sands to solvent | Amount of HC extracted, g | Percent HC extracted | Temp, ° C. | Exposure Time, minutes |
|---|---|---|---|---|---|---|---|---|
| 60/30/10 terpineol | 60 | 2.0 | 60.0 | 1:1 | 7.1 | 91 | 96 | 30 |
| 40/30/20 terpineol | 60 | 7.8 | 60.0 | 1:1 | 4.7 | 60 | 96 | 30 |
| 70/20/10 terpineol | 60 | 7.8 | 60.0 | 1:1 | 7.9 | 101 | 96 | 30 |
| 100/0/0 terpineol | 60 | 7.8 | 60.0 | 1:1 | 10.0 | 128 | 96 | 30 |
| 100/0/0 terpineol | 60 | 7.8 | 120.0 | 1:2 | 8.7 | 111 | 96 | 30 |
| 100/0/0 terpineol | 60 | 7.8 | 31.0 | 2:1 | 9.6 | 123 | 96 | 30 |

TABLE 8-continued

| Chemical comp. | Tar Sands wt., g | Extractable HC wt., g | Wt. of solvent | Ratio of tar sands to solvent | Amount of HC extracted, g | Percent HC extracted | Temp, °C. | Exposure Time, minutes |
|---|---|---|---|---|---|---|---|---|
| 50% α-terpineol/ 50% ethanol | 15 | 2.0 | 15.0 | 1:1 | 8.1 | 103 | 65 | 30 |
| 80% α-terpineol/ 20% ethanol | 15 | 2.0 | 15.0 | 1:1 | 1.2 | 62 | 15 | 15 |
| 75% α-terpineol/ 25% toluene | 30 | 3.9 | 25.0 | 1:0.8 | 1.8 | 92 | 15 | 15 |
| 50% α-terpineol/ 50% toluene | 30 | 3.9 | 26.0 | 1:0.9 | 3.0 | 77 | 96 | 30 |
| 50% α-terpineol/ 50% xylenes | 30 | 3.9 | 26.0 | 1:0.9 | 2.4 | 61 | 96 | 30 |

Example 23

Figure 5:
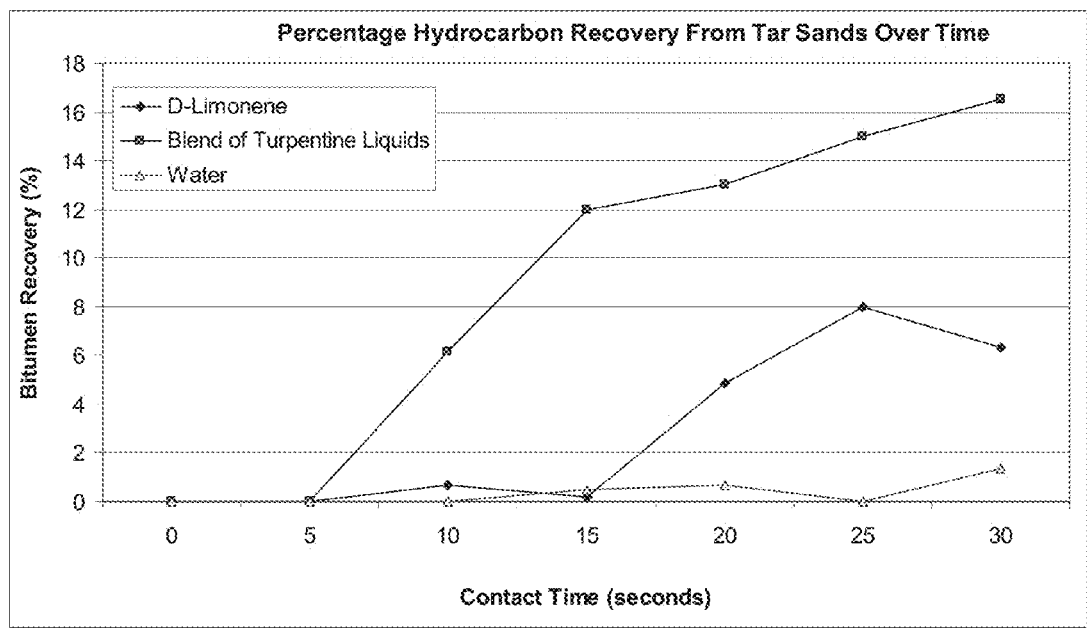
FIG. 5 shows a time course of percentage of bitumen recovery vs. contact time with various liquids (d-limonene, blend of turpentine liquids, and water) up to 30 seconds.

Approximately 30 g tar sands samples were sprayed with each of the following liquids: d-limonene, a blend of turpentine liquids, and water as a control. Temperature was maintained at about 18° C. The percent of bitumen recovered was measured after a contact time of about 5, 10, 15, 20, 25, and 30 seconds. The blend of turpentine liquids was a more effective extractor than d-limonene, whereas water was ineffective (see FIG. 5).

Example 24

Figure 6:
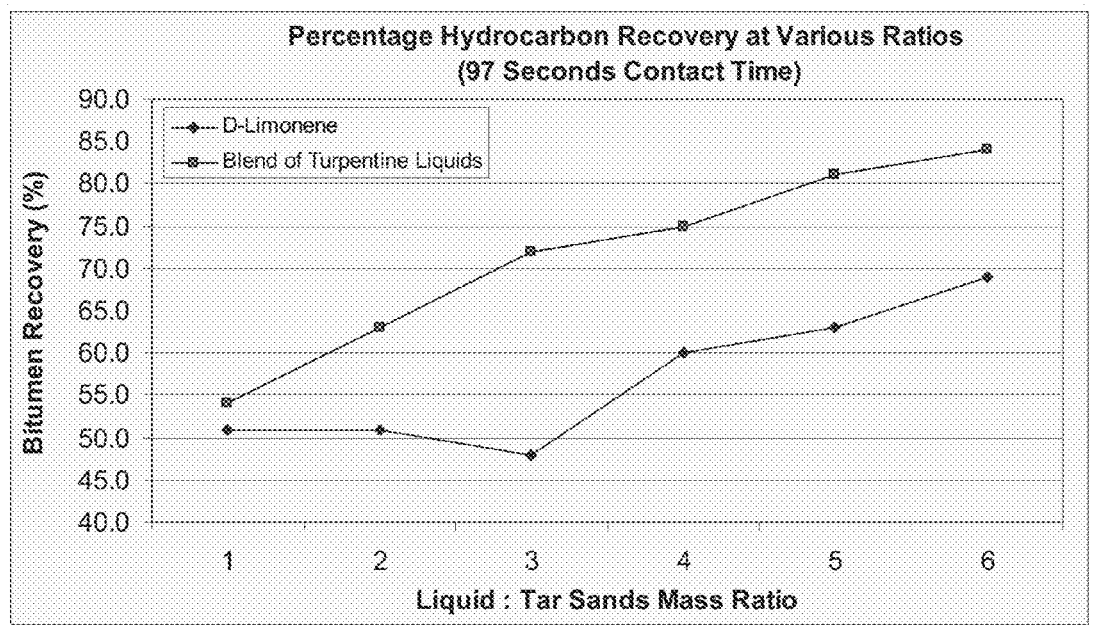
FIG. 6 shows the amount of bitumen recovered over a range of Liquid to Tar Sands ratios from 1:1 to 6:1 after a 97 second contact time for the blend of turpentine liquids and d-limonene.

Approximately 15 g tar sands samples were sprayed with d-limonene or a blend of turpentine liquids and left in contact with the liquid for 97 seconds. The ratio of liquid to tar sands ranged from approximately 1:1 to approximately 6:1. From 54% recovery at 1:1 to 84% recovery at 6:1 ratios, the blend of turpentine liquids extracted more bitumen than the limonene across the range of mixing ratios (see FIG. 6).

Example 25

Figure 7:
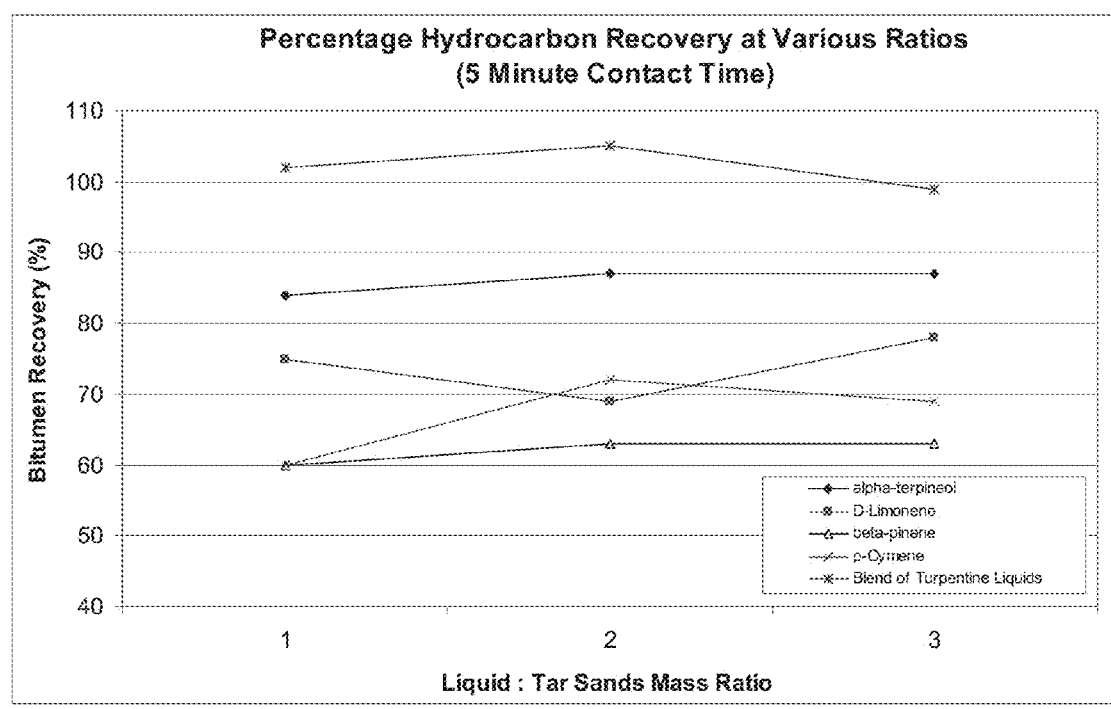
FIG. 7 shows the amount of bitumen recovered over a range of Liquid to Tar Sands ratios from 1:1 to 6:1 after a 5 minute contact time.
Figure 8:
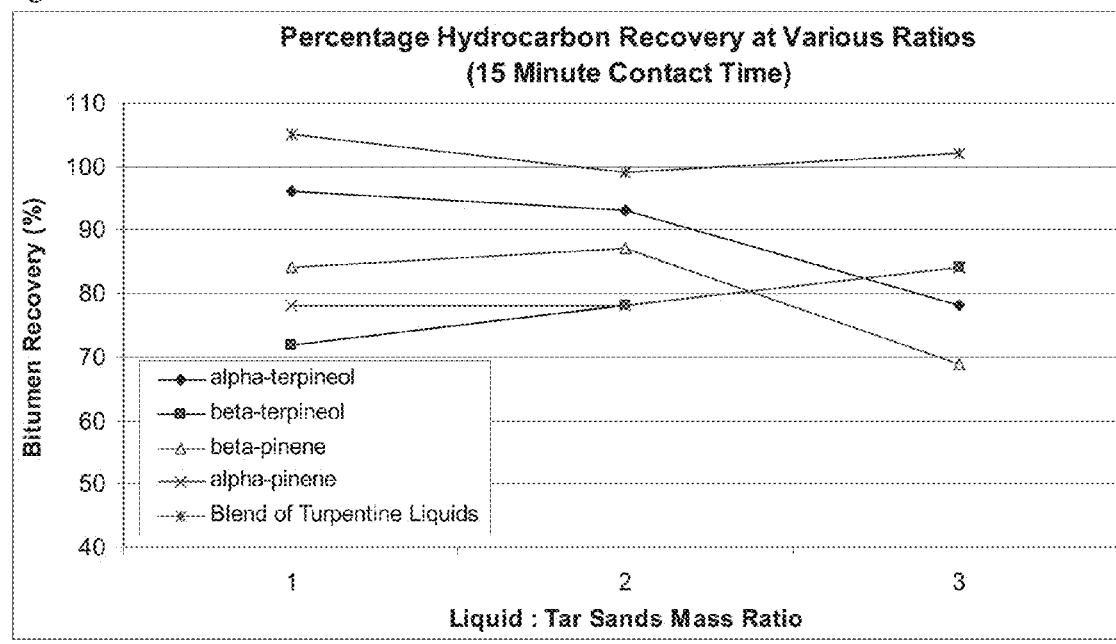
FIG. 8 shows the amount of bitumen recovered over a range of Liquid to Tar Sands ratios from 1:1 to 3:1 after a 15 minute contact time.

The effectiveness of a number of turpentine liquid species and combinations for extracting hydrocarbon was measured relative to the ability of each liquid to recover bitumen from a tar sands sample. In each test, an approximately 15 g tar sands sample was treated at about 18° C. with one of the following turpentine liquids: α-terpineol, β-terpineol, β-pinene, α-pinene p-cymene, d-limonene, and a blend of turpentine liquids. The percent of bitumen recovered was measured after contact times of about 5 (FIG. 7) and about 15 (FIG. 8) minutes. The data show that all of the liquids extracted a substantial amount of the bitumen from the tar sands. The blend of turpentine liquids was the most effective extractor across the range of liquid to material ratios, recovering nearly all of the bitumen content within about 5 minutes of contact (see FIG. 7).

Example 26

The amount of SAE 40 (a medium-weight crude oil) that could be extracted by a blend of turpentine liquids was compared against n-butanol, cyclohexanol, and 1-heptanol. At 35° C., it was found that the amount of SAE 40 extracted into 100 ml of a blend of turpentine liquids consisting of about 50% α-terpineol, about 35% β-terpineol, about 10% β-pinene, and about 5% p-cymene was approximately 8.14-, 6.67-, and 7.46-fold more than the amount of SAE 40 that was extracted into 100 ml n-butanol, 100 ml cyclohexanol, and 100 ml 1-heptanol, respectively. Each of the alkaline solutions contained 150 ml of 97% sodium metasilicate.

Example 27

Approximately 15 g and 30 g samples of paraffin wax, and approximately 100 g samples of asphaltines were extracted into 100% α-terpineol and 100% of a blend of turpentine liquids at about 60° C. for about 15 minutes. Table 9 shows the percentage of hydrocarbon solids that were extracted into the turpentine liquids.

Comparative Example

In a comparative example, the use of a liquid consisting of about ⅓ terpenoids (limonene, pinene), about ⅓ heavy petroleum distillates, and about ⅓ light petroleum distillates to liquefy paraffin waxes and asphaltenes was compared against α-terpineol and the multi-component turpentine system using the same method as described in Example 27. A comparison of the percentage of paraffin wax and asphaltines extracted is shown in Table 9.

TABLE 9

| | % extracted | | % extracted | |
|---|---|---|---|---|
| Solvent | 15 g paraffin wax | 30 g paraffin wax | 100 g asphaltine (1) | 100 g asphaltine (2) |
| ⅓ β-Pinene, ⅓ heavy crude, 1/3 light crude | 60 | 60 | 42 | 47 |
| Alpha terpineol | 100 | 100 | 100 | 100 |
| Blend of turpentine liquids | 93.3 | 90 | 100 | 100 |

Example 28

Table 10 shows the decrease in viscosity of oils of different weights after contact with turpentine liquids. Measurements were taken within 20 seconds at a temperature of about 21° C. The largest percentage drop in viscosity is obtained by contacting heavier oils with a blend of turpentine liquids.

TABLE 10

| Type of Oil | Viscosity Reducing Liquid (weight % ratio to oil) | Viscosity | % viscosity decrease |
|---|---|---|---|
| SAE 40 | None | 718-750 | N/A |
| SAE 40 | α-terpineol (10%) | 697-699 | 7% (mean) |
| SAE 40 | α-terpineol (15%) | 569-620 | 21% (mean) |
| SAE 40 | Blend of turpentine liquids (10%) | 297 | 60% |
| SAE 40 | Blend of turpentine liquids (15%) | 245 | 67% |
| SAE 30 | None | 156 | N/A |
| SAE 30 | Blend of turpentine liquids (10%) | 109 | 30% |
| SAE 30 | Blend of turpentine liquids (15%) | 88 | 44% |
| SAE 10 | None | 49 | N/A |
| SAE 10 | Blend of turpentine liquids (10%) | 35 | 29% |

Example 29

Corrosion Test. API X-65 carbon steel coupons (METAL SAMPLES COMPANY, Munford, Ala., USA) were exposed to ASTM substitute seawater with 500 ppm $Na_2S$, pH adjusted to about 4.8 using acetic acid, under continuous flow for two weeks. A control sample contained only a baseline solution of the seawater in the absence of corrosion inhibitor. Samples I, II, and III contained about 0.0005%, 0.001%, and 0.0015% by volume of a blend of turpentine liquids. The corrosion rates recorded directly coincide with the amount of crevice attack observed on each test coupon. Sample III, consisting of about 0.0015% by volume of a blend of turpentine liquids produced the lowest average corrosion rate (see Table 11) and no pitting corrosion.

TABLE 11

| Inhibitor | Initial weight of coupon (g) | | Final weight of coupon (g) | | Average corrosion rate (mpy) |
|---|---|---|---|---|---|
| | Test 1 | Test 2 | Test 1 | Test 2 | |
| Baseline solution only | 16.1143 | 16.3113 | 16.1066 | 16.3037 | 0.36 |
| 5% Blend of turpentine liquids | 16.5291 | 16.7320 | 16.5247 | 16.7260 | 0.24 |
| 10% Blend of turpentine liquids | 17.0128 | 17.0229 | 17.0066 | 17.0172 | 0.28 |
| 15% Blend of turpentine liquids | 17.1076 | 16.4431 | 17.1056 | 16.4412 | 0.09 |

Example 30

The extracting ability of a surfactant free blend of turpentine liquids was compared to d-limonene containing 0, 3, 9, and 12% surfactant (Surfonic N-95 from Huntsman). The surfactant free blend of turpentine liquids and d-limonene with surfactant were contacted with 30 g of Super Pave Asphalt (weight of aggregate: 92.9%, weight of asphalt: 6.6%, weight of polymer: 0.5%) for two minutes, at a 1:1 ratio of liquid to asphalt at 45° C. The amount of asphalt recovery for the surfactant free blend of turpentine liquids was 8.3%, while the d-limonene recovered only 4%, 6.3%, 5.3%, and 5.7% asphalt at 0, 3, 9, and 12% surfactant, respectively. The surfactant-free blend of turpentine liquids extracted more hydrocarbon-containing organic matter from asphalt than d-limonene with or without surfactant.

The results for the extraction of hydrocarbon-containing organic matter from hydrocarbon-containing material described in the specification, and especially in the Examples above, were unexpected.

As measured herein, the recovery, i.e., yield, in certain samples exceeds 100% because certain hydrocarbon-containing materials, e.g. tar sands, comprise heterogeneous and impure mixtures of exceedingly viscous liquid and relatively coarse solid particles, irregular in shape and varying in size. Thus, recovery measurements based on the average value of hydrocarbon matter in the hydrocarbon-containing materials at times exceed 100% due to these naturally variable factors. Further, some experimental errors are inherent to any experiment.

As used herein, the terms about and approximately should be interpreted to include any values which are within 5% of the recited value. Furthermore, recitation of the term about and approximately with respect to a range of values should be interpreted to include both the upper and lower end of the recited range. As used herein, the terms first, second, third and the like should be interpreted to uniquely identify elements and do not imply or restrict to any particular sequencing of elements or steps.

While the invention has been shown or described in only some of its embodiments, it should be apparent to those skilled in the art that it is not so limited, but is susceptible to various changes without departing from the scope of the invention.

The invention claimed is:

1. A method of inhibiting the corrosive and toxic effects of a reactive sulfur species in a sulfur-containing hydrocarbon containing material from a natural geological formation containing, comprising:
providing a substantially surfactant-free, non-aqueous turpentine liquid selected from the group consisting of natural turpentine, synthetic turpentine, mineral turpentine, pine oil, α-pinene, β-pinene, α-terpineol, β-terpineol, γ-terpineol, terpene resins, α-terpene, β-terpene, γ-terpene, geraniol, 3-carene, dipentene (p-mentha-1,8-diene), nopol, pinane, 2-pinane hydroperoxide, terpin hydrate, 2-pinanol, dihydromycenol, isoborneol, p-menthan-8-ol, α-terpinyl acetate, citronellol, p-menthan-8-yl acetate, 7-hydroxydihydrocitronellal, menthol, anethole, camphene; p-cymene, anisaldeyde, 3,7-dimethyl-1,6-octadiene, isobornyl acetate, ocimene, alloocimene, alloocimene alcohols, 2-methoxy-2,6-dimethyl-7,8-epoxyoctane, camphor, citral, 7-methoxy-dihydro-citronellal, 10-camphorsulphonic acid, cintronellal, menthone, and mixtures thereof;
contacting the sulfur-containing hydrocarbon-containing material with the substantially surfactant-free, non-aqueous turpentine liquid such that at least a portion of the reactive sulfur species from said sulfur-containing hydrocarbon containing material is extracted into the substantially surfactant-free, non-aqueous turpentine liquid from the natural geological formation; and
recovering hydrocarbon containing material from which reactive sulfur species has been removed such that the corrosive and toxic effects of reactive sulfur species in the hydrocarbon containing material is inhibited.

2. The method of claim 1, further comprising separating the substantially surfactant-free, non-aqueous turpentine liquid containing the reactive sulfur species from any residual material that is not soluble in the substantially surfactant-free, non-aqueous turpentine liquid.

3. The method of claim 1, wherein said sulfur-containing hydrocarbon containing material is at least one of natural gas, petroleum gas, crude oil, tar sands, oil shale, asphalt, bitumen, and coal.

4. The method of claim 1, wherein the reactive sulfur species is at least one of elemental sulfur, hydrogen sulfide, sulfides, disulfides, mercaptans, thiophenes, and benzothiophenes.

5. The method of claim 1, wherein said sulfur-containing hydrocarbon containing material is natural gas or petroleum gas.

6. The method of claim 5, further comprising bubbling said natural gas or petroleum gas through said hydrocarbon-extracting liquid to sweeten the natural gas or petroleum gas.

7. A method of recovering natural gas trapped in a gas reservoir and avoiding subsidence at the reservoir comprising:

injecting into the reservoir a substantially surfactant-free, non-aqueous turpentine liquid selected from the group consisting of natural turpentine, synthetic turpentine, mineral turpentine, pine oil, α-pinene, β-pinene, α-terpineol, β-terpineol, γ-terpineol, terpene resins, α-terpene, β-terpene, γ-terpene, geraniol, 3-carene, dipentene (p-mentha-1,8-diene), nopol, pinane, 2-pinane hydroperoxide, terpin hydrate, 2-pinanol, dihydromycenol, isoborneol, p-menthan-8-ol, α-terpinyl acetate, citronellol, p-menthan-8-yl acetate, 7-hydroxydihydrocitronellal, menthol, anethole, camphene; p-cymene, anisaldeyde, 3,7-dimethyl-1,6-octadiene, isobornyl acetate, ocimene, alloocimene, alloocimene alcohols, 2-methoxy-2,6-dimethyl-7,8-epoxyoctane, camphor, citral, 7-methoxydihydro-citronellal, 10-camphorsulphonic acid, cintronellal, menthone, and mixtures thereof;

maintaining reservoir pressure using said substantially surfactant-free, non-aqueous turpentine liquid injection;

contacting the natural gas with the substantially surfactant-free, non-aqueous turpentine liquid such that at least a portion of the natural gas from the reservoir is extracted into the substantially surfactant-free, non-aqueous turpentine liquid to form an extraction mixture; and recovering the extraction mixture from a production well; and separating said natural gas from said substantially surfactant-free, non-aqueous turpentine liquid to form a recycled liquid while maintaining reservoir pressure.

8. The method of claim 7, further comprising injecting the recycled liquid into the reservoir.

* * * * *